US010582525B2

(12) United States Patent
Saiwai et al.

(10) Patent No.: US 10,582,525 B2
(45) Date of Patent: Mar. 3, 2020

(54) COMMUNICATION CONTROL METHOD, BASE STATION, AND USER TERMINAL, FOR PERFORMING D2D COMMUNICATION

(71) Applicant: KYOCERA CORPORATION, Kyoto (JP)

(72) Inventors: Takahiro Saiwai, Kawasaki (JP); Masato Fujishiro, Yokohama (JP); Atsuhisa Inakoshi, Kawasaki (JP); Kugo Morita, Yokohama (JP)

(73) Assignee: KYOCERA Corporation, Kyoto (JP)

(*) Notice: Subject to any disclaimer, the term of this patent is extended or adjusted under 35 U.S.C. 154(b) by 0 days.

(21) Appl. No.: 14/901,352

(22) PCT Filed: Jun. 24, 2014

(86) PCT No.: PCT/JP2014/066711
§ 371 (c)(1),
(2) Date: Dec. 28, 2015

(87) PCT Pub. No.: WO2014/208559
PCT Pub. Date: Dec. 31, 2014

(65) Prior Publication Data
US 2016/0157258 A1 Jun. 2, 2016

(30) Foreign Application Priority Data

Jun. 27, 2013 (JP) ................ 2013-135606

(51) Int. Cl.
H04W 4/00 (2018.01)
H04W 72/12 (2009.01)
(Continued)

(52) U.S. Cl.
CPC ....... H04W 72/1231 (2013.01); H04L 5/0048 (2013.01); H04L 5/0051 (2013.01);
(Continued)

(58) Field of Classification Search
CPC ................................. H04W 72/1231
See application file for complete search history.

(56) References Cited

U.S. PATENT DOCUMENTS 9,338,807 B2 * 5/2016 Kwon ............... H04W 52/242
2004/0203844 A1 * 10/2004 Rajkotia ............ H04W 64/00
455/456.1
(Continued)

FOREIGN PATENT DOCUMENTS

JP    2012-227884 A   11/2012
JP    2013-074486 A   4/2013
WO    2013/016422 A1  1/2013

OTHER PUBLICATIONS

An Office Action; "Final Reason for Rejection," issued by the Japanese Patent Office on Feb. 21, 2017, which corresponds to Japanese Patent Application No. 2013-135606; and is related to U.S. Appl. No. 14/901,352; with English language Concise Explanation; 5pp.
(Continued)

Primary Examiner — Gerald A Smarth
(74) Attorney, Agent, or Firm — Studebaker & Brackett PC

(57) ABSTRACT

A communication control method according to the present invention comprises: notifying, by the base station, the at least one or more communication devices of reference signal configuration information designating a parameter of the uplink reference signal; transmitting, by the user terminal, the uplink reference signal to the base station; and receiving, on the basis of the reference signal configuration information, by the at least one or more communication devices, the uplink reference signal transmitted from the user terminal; and measuring, on the basis of the received uplink reference signal, by the at least one or more communication devices, (Continued)

a channel state between the at least one or more communication devices and the user terminal.

6 Claims, 12 Drawing Sheets

(51) Int. Cl.
*H04W 16/28* (2009.01)
*H04L 5/00* (2006.01)
*H04W 76/14* (2018.01)
*H04W 72/04* (2009.01)
*H04W 92/18* (2009.01)

(52) U.S. Cl.
CPC ....... *H04W 16/28* (2013.01); *H04W 72/0413* (2013.01); *H04W 76/14* (2018.02); *H04L 5/0091* (2013.01); *H04W 92/18* (2013.01)

(56) References Cited

U.S. PATENT DOCUMENTS

| | | | | |
|---|---|---|---|---|
| 2010/0029211 A1* | 2/2010 | Teague | ................ | H04W 52/243 455/63.1 |
| 2010/0169498 A1* | 7/2010 | Palanki | ................ | H04W 16/14 709/228 |
| 2011/0268006 A1* | 11/2011 | Koskela | ................ | H04W 4/70 370/312 |
| 2011/0275382 A1* | 11/2011 | Hakola | ................ | H04W 24/10 455/452.2 |
| 2012/0213183 A1* | 8/2012 | Chen | ................ | H04W 72/1278 370/329 |
| 2013/0003657 A1* | 1/2013 | Iwamura | ................ | H04L 5/001 370/328 |
| 2013/0084795 A1* | 4/2013 | Van Phan | .......... | H04B 7/15592 455/15 |
| 2013/0094449 A1* | 4/2013 | Takeda | ................ | H04L 1/1854 370/329 |
| 2013/0273923 A1* | 10/2013 | Li | ................ | H04W 28/02 455/450 |
| 2013/0322276 A1* | 12/2013 | Pelletier | .............. | H04W 72/085 370/252 |
| 2014/0038633 A1* | 2/2014 | Iwamura | ............... | H04W 24/10 455/452.2 |
| 2014/0187283 A1* | 7/2014 | Nimbalker | .......... | H04W 72/048 455/550.1 |
| 2014/0233522 A1 | 8/2014 | Tokairin et al. | | |
| 2015/0146633 A1* | 5/2015 | Kalhan | ................ | H04L 1/1607 370/329 |

OTHER PUBLICATIONS

LG Electronics; "Physical layer enhancements for D2D communication"; 3GPP TSG RAN WG1 #73; R1-132250; May 20-34, 2013; Fukuoka, Japan; 10pp.

Physical Layer Options for D2D Communication, 3GFP TSG RAN WGI Meeting #73, Huawei, HiSilicon, May 20-24, 2013, pp. 1-6, Fukuoka, Japan.

3GPP TR 22.803, V12.1.0, Mar. 2013, 3rd Generation Partnership Project; Technical Specification Group Services and System Aspects; Feasibility study for Proximity Services (ProSe), pp. 1-45.

International Search Report of PCT/JP2014/066711 dated Sep. 30, 2014.

Written Opinion of PCT/JP2014/066711 dated Sep. 19, 2014.

An Office Action issued by the Japanese Patent Office on Oct. 24, 2017, which corresponds to Japanese Patent Application No. 2013-135606 and is related to U.S. Appl. No. 14/901,352; with English language Concise Explanation.

Renesas Mobile Europe Ltd, "ProSe direct communication (D2D)", 3GPP TSG-RAN WG1 Meeting #73, R1-132174, May 20-24, 2013, Fukuoka, Japan.

ZTE, "Discussions on LTE Device to Device Communication", 3GPP TSG-RAN WG1 Meeting #73, R1-132115, May 20-24, 2013, Fukuoka, Japan.

Intel Corporation, "Discussion on design options for D2D communication", 3GPP TSG-RAN WG1 Meeting #73, R1-131925, May 20-24, 2013, pp. 1-5, Fukuoka, Japan.

\* cited by examiner

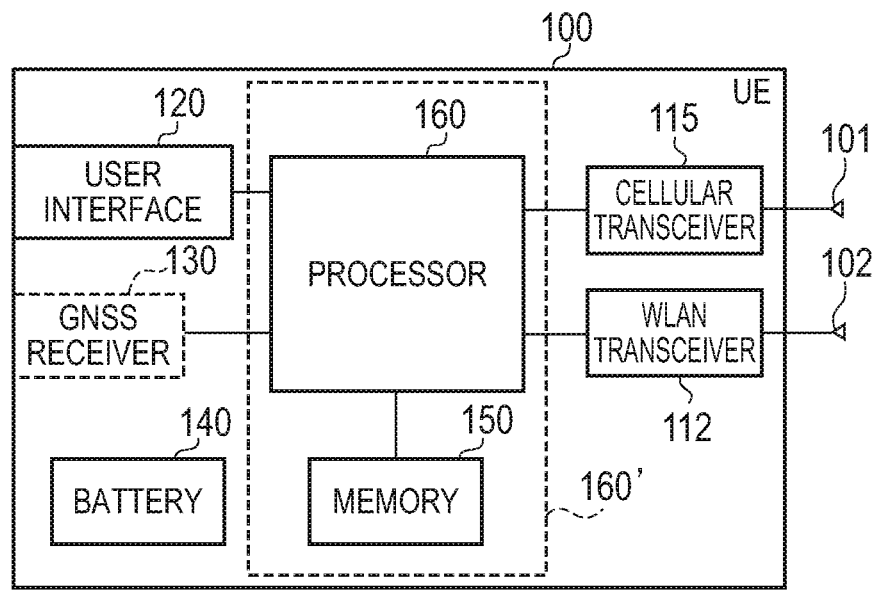
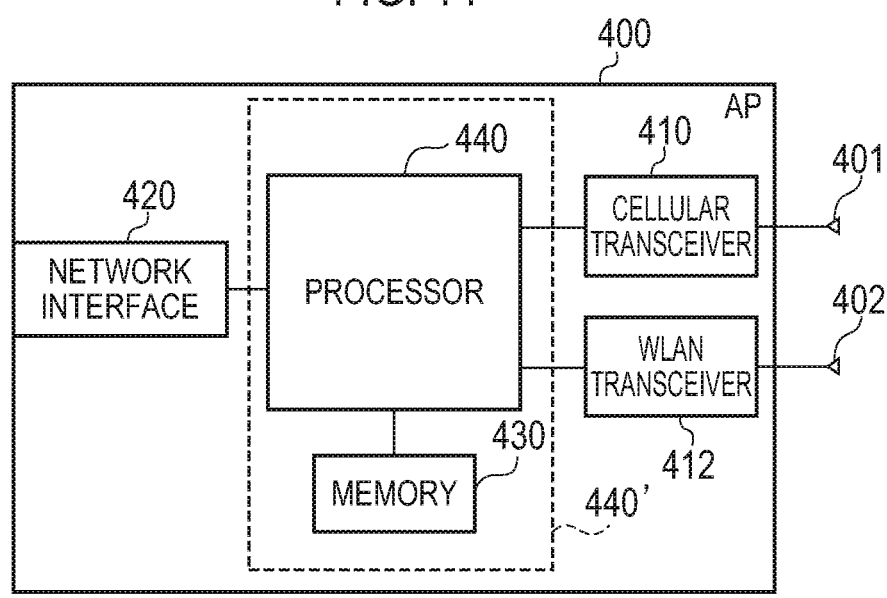

COMMUNICATION CONTROL METHOD, BASE STATION, AND USER TERMINAL, FOR PERFORMING D2D COMMUNICATION

TECHNICAL FIELD

The present invention relates to a communication control method, a base station, and a user terminal, used in a mobile communication system.

BACKGROUND ART

In 3GPP (3rd Generation Partnership Project) which is a project aiming to standardize a mobile communication system, the introduction of device-to-device (D2D) communication is discussed as a new function after Release 12 (see Non Patent Literature 1).

In the D2D communication, a plurality of neighboring user terminals perform direct communication without passing through a core network. That is, a data path of the D2D communication does not pass through the core network. On the other hand, a data path of normal communication (cellular communication) of a mobile communication system passes through the core network.

CITATION LIST

Non Patent Literature

[NPL 1]3GPP Technical Report "TR 22.803 V12.1.0" March 2013

SUMMARY OF INVENTION

In the present specifications, there is no mechanism in which a channel state between user terminals is measured. Therefore, in order to efficiently perform the D2D communication, it is considered that a reference signal for measuring the channel state between user terminals is newly defined.

However, there is a problem that a user terminal that establishes a connection with abase station transmits an uplink reference signal (SRS) for measuring a channel state between the user terminal and the base station, and thus, when transmitting a new reference signal to measure a channel state between user terminals, it is necessary to add a radio resource for the new reference signal, and therefore, a radio resource is oppressed in view of a whole system.

Further, not only when the channel state between the user terminals is measured, but also when, for example, a channel state between the user terminal and a plurality of base stations (as an example, a macro base station and a small cell base station) is measured, in the present specifications, a common uplink reference signal for measuring a channel state is not defined, and thus, the same problem occurs.

Therefore, the present invention provides a communication control method with which it is possible to measure a channel state from a user terminal while preventing a radio resource from being oppressed in view of a whole system without a need of defining anew uplink reference signal, a base station therefor, and a user terminal therefor.

A communication control method according to one embodiment is used in a communication system including a user terminal, abase station that receives an uplink reference signal transmitted from the user terminal, and at least one or more communication devices different from the base station. The communication control method comprises notifying, by the base station, the at least one or more communication devices of reference signal configuration information designating a parameter of the uplink reference signal; transmitting, by the user terminal, the uplink reference signal to the base station; and receiving, on the basis of the reference signal configuration information, by the at least one or more communication devices, the uplink reference signal transmitted from the user terminal; and measuring, on the basis of the received uplink reference signal, by the at least one or more communication devices, a channel state between the at least one or more communication devices and the user terminal.

BRIEF DESCRIPTION OF DRAWINGS

FIG. 13 is a block diagram of UE 100 according to the second embodiment.
FIG. 14 is a block diagram of AP 400 according to the second embodiment.

DESCRIPTION OF EMBODIMENTS

Overview of Embodiments

Figure 1:
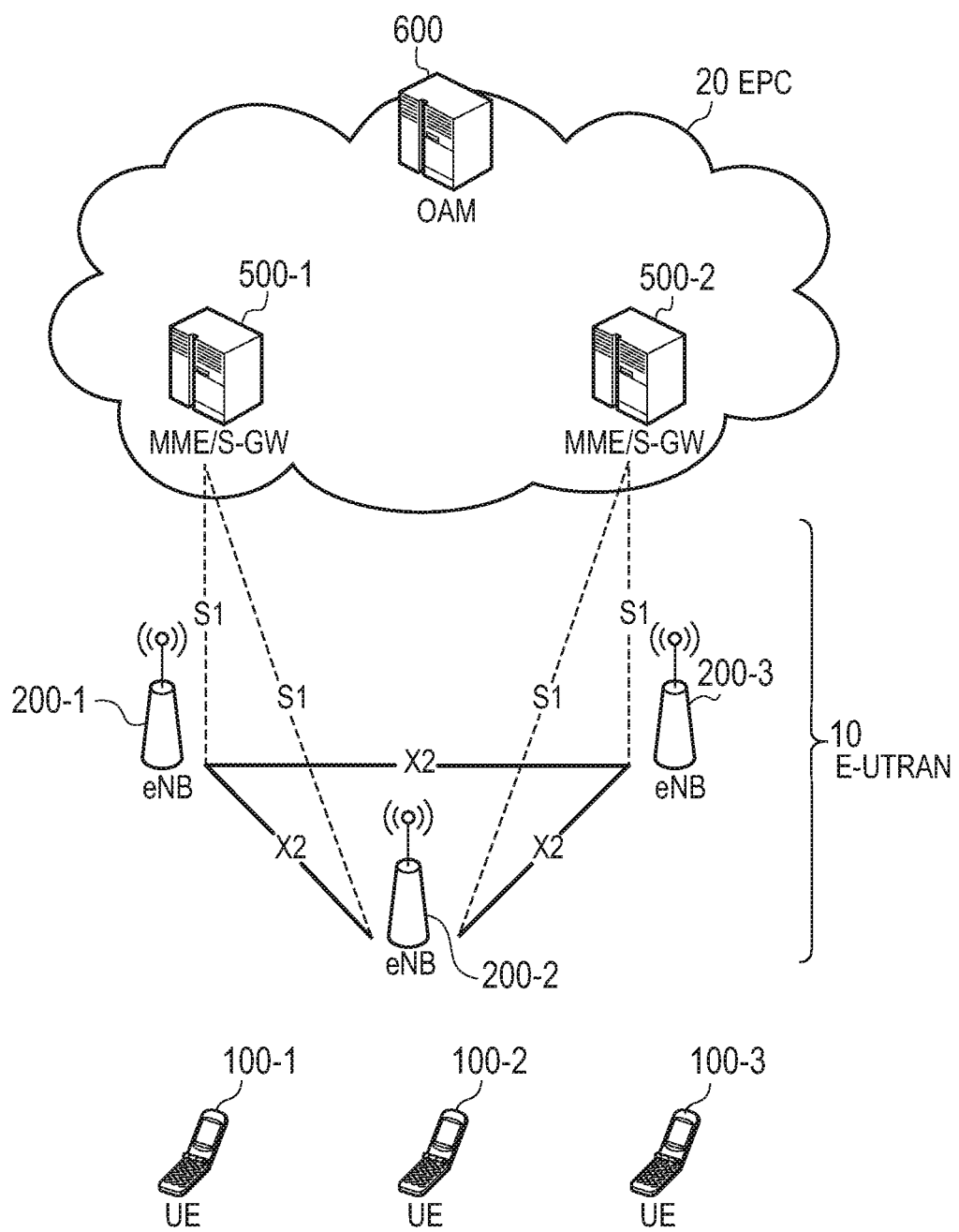
FIG. 1 is a configuration diagram of an LTE system.

A communication control method according to embodiments is communication control method used in a communication system including a user terminal, a base station that receives an uplink reference signal transmitted from the user terminal, and at least one or more communication devices different from the base station, comprising notifying, by the base station, the at least one or more communication devices of reference signal configuration information designating a parameter of the uplink reference signal; transmitting, by the user terminal, the uplink reference signal to the base station; and receiving, on the basis of the reference signal configuration information, by the at least one or more communication devices, the uplink reference signal transmitted from the user terminal; and measuring, on the basis of the received uplink reference signal, by the at least one or more communication devices, a channel state between the at least one or more communication devices and the user terminal.

It is noted that as an example of the at least one or more communication devices, a user equipment (UE), a base station (MeNB, HeNB, PeNB), a wireless LAN access point (AP) may be exemplified, but it is not limited to this.

In a first embodiment, the at least one or more communication devices include other user terminal configured to perform D2D communication that is direct device-to-device communication with the user terminal. The communication control method according to the first embodiment further comprises transmitting to the base station channel state information indicating the channel state measured by the other user terminal in the measuring; and performing, by the base station, scheduling of the user terminal on the basis of the channel state information, for the D2D communication.

In the communication control method according to the first embodiment, the receiving includes receiving, by the base station, the uplink reference signal; and the measuring includes measuring, by the base station, on the basis of the uplink reference signal received in the receiving, a channel state between the base station and the user terminal. In the performing, the base station performs, for beamforming and/or null steering to the user terminal, scheduling of the user terminal on the basis of the channel state between the other user terminal and the user terminal and/or the channel state between the base station and the user terminal.

In a modification of the first embodiment, the at least one or more communication devices include other user terminal configured to perform D2D communication that is direct device-to-device communication with the user terminal. The communication control method according to the first embodiment further comprises performing, by the user terminal or the other user terminal, scheduling for the D2D communication on the basis of the channel state measured by the other user terminal in the measuring.

In a second embodiment, the communication system further comprises a determination device configured to select a connection target of the user terminal. The communication control method according to the second embodiment further comprises notifying, by the at least one or more communication devices, the determination device of channel state information indicating the channel state measured in the measuring; and selecting, by the determination device, the connection target of the user terminal, on the basis of the channel state information notified from the at least one or more communication devices and/or a channel state measured as a result of the base station receiving the uplink reference signal.

In the communication control method according to the second embodiment, in the notifying the channel state information, the at least one or more communication devices further notify the determination device of, together with the channel state information, communication information on communication of the at least one or more communication devices, and in the selecting, the determination device selects the connection target of the user terminal on the basis of the channel state information and the communication information of the at least one or more communication devices.

In a modification of the second embodiment, the at least one or more communication devices include a neighboring base station adjacent to the base station, and the communication control method according to the modification of the second embodiment further comprises cooperatively performing communication with the user terminal, by the base station and the neighboring base station, on the basis of the channel state measured in the measuring and channel state measured as a result of the base station receiving the uplink reference signal.

In the modification of the second embodiment, the reference signal configuration information includes information for adjusting a timing at which the at least one or more communication devices receive the uplink reference signal.

In the modification of the first embodiment, it further comprises requesting, by the at least one or more communication devices, a notification of the reference signal configuration information to the base station. In the notifying, the base station notifies the reference signal configuration information on the basis of the request of the notification of the reference signal configuration information.

A base station according to the first and the second embodiments is in a communication system including a user terminal, a base station that receives an uplink reference signal transmitted from the user terminal, and at least one or more communication devices different from the base station. The base station comprises a controller configured to control to notify the at least one or more communication devices of reference signal configuration information designating a parameter of the uplink reference signal.

A user terminal according to the first and the second embodiments is in a communication system including a user terminal, abase station that receives an uplink reference signal transmitted from the user terminal, and at least one or more communication devices different from the base station. The at least one or more communication devices are capable of acquiring reference signal configuration information designating a parameter of the uplink reference signal from the base station. The user terminal comprises a transmitter configured to transmit the uplink reference signal for the base station and the at least one or more communication devices.

First Embodiment

With reference to the accompanying drawings, the description will be provided for each embodiment when D2D communication is introduced to a cellular mobile communication system (hereinafter, an "LTE system") configured to comply with the 3GPP standards, below.

(LTE System)

FIG. 1 is a configuration diagram of the LTE system according to the present embodiment.

As shown in FIG. 1, the LIE system includes a plurality of UEs (User Equipments) 100, E-UTRAN (Evolved Universal Terrestrial Radio Access Network) 10, and EPC (Evolved Packet Core) 20. The E-UTRAN 10 and the EPC 20 configure a network.

The UE 100 is a mobile-type radio communication device and performs radio communication with a cell (serving cell) with which a connection is established. The UE 100 corresponds to a user terminal.

The E-UTRAN 10 includes a plurality of eNBs 200 (evolved Node-Bs). The eNB 200 corresponds to a base station. The eNB 200 manages a cell and performs radio communication with the UE 100 that establishes a connection with the cell.

It is noted that the "cell" is used as a term indicating a minimum unit of a radio communication area, and is also used as a term indicating a function of performing radio communication with the UE 100.

The eNB 200, for example, has a radio resource management (RRM) function, a routing function for user data, and a measurement control function for mobility control and scheduling.

The EPC 20 includes MME (Mobility Management Entity)/S-GW (Serving-Gateway) 500, and OAM 600 (Operation and Maintenance). Further, the EPC 20 corresponds to a core network.

The MME is a network node that performs various mobility controls, etc., on the UE 100, and corresponds to a control station. The S-GW is a network node that performs control to transfer user data and corresponds to a mobile switching center.

The eNB 200 is connected mutually via an X2 interface. Further, the eNB 200 is connected to the MME/S-GW 500 via an S1 interface.

The OAM 600 is a server device managed by an operator and performs maintenance and monitoring of the E-UTRAN 10.

Next, the configurations of the UE 100 and the eNB 200 will be described.

Figure 2:
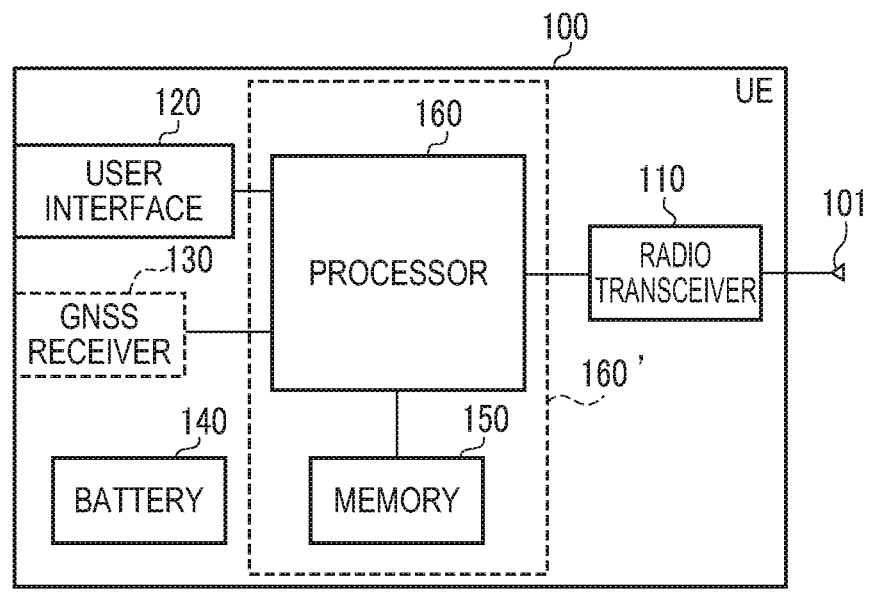
FIG. 2 is a block diagram of UE according to a first embodiment.

FIG. 2 is a block diagram of the UE 100. As shown in FIG. 2, the UE 100 includes an antenna 101, a radio transceiver 110, a user interface 120, a GNSS (Global Navigation Satellite System) receiver 130, a battery 140, a memory 150, and a processor 160. The memory 150 and the processor 160 configure a controller.

The UE 100 may not necessarily have the GNSS receiver 130. Furthermore, the memory 150 may be integrally formed with the processor 160, and this set (that is, a chip set) may be called a processor 160'.

The antenna 101 and the radio transceiver 110 are used to transmit and receive a radio signal. The antenna 101 includes a plurality of antenna elements. The radio transceiver 110 converts a baseband signal output from the processor 160 into the radio signal, and transmits the radio signal from the antenna 101. Furthermore, the radio transceiver 110 converts the radio signal received by the antenna 101 into the baseband signal, and outputs the baseband signal to the processor 160.

The user interface 120 is an interface with a user carrying the UE 100, and includes, for example, a display, a microphone, a speaker, various buttons, and the like. The user interface 120 receives an operation from a user and outputs a signal indicating the content of the operation to the processor 160.

The GNSS receiver 130 receives a GNSS signal in order to obtain location information indicating a geographical location of the UE 100, and outputs the received signal to the processor 160.

The battery 140 accumulates power to be supplied to each block of the UE 100.

The memory 150 stores a program to be executed by the processor 160 and information to be used for a process by the processor 160.

The processor 160 includes a baseband processor that performs modulation and demodulation, coding and decoding, and the like on the baseband signal, and a CPU (Central Processing Unit) that performs various types of processes by executing the program stored in the memory 150. The processor 160 may further include a codec that performs encoding and decoding on sound and video signals. The processor 160 executes various types of processes and various types of communication protocols described later.

Figure 3:
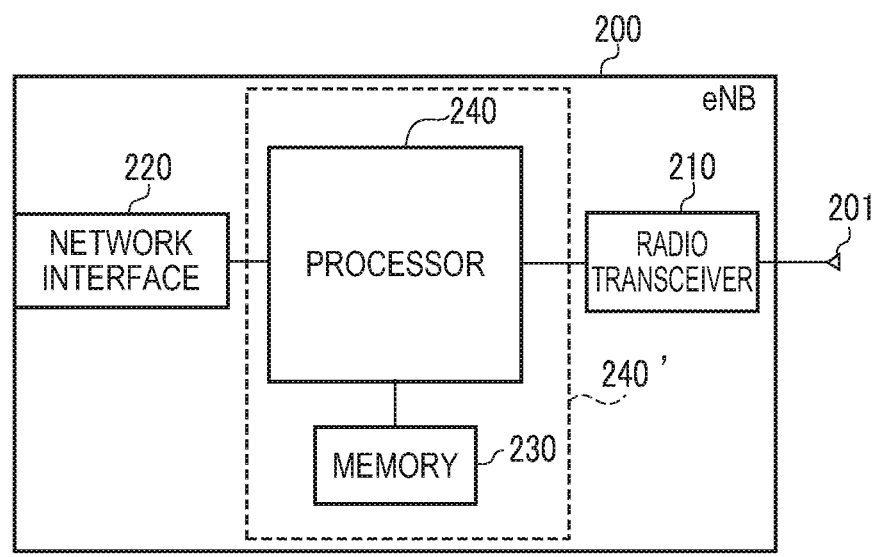
FIG. 3 is a block diagram of eNB.

FIG. 3 is a block diagram of the eNB 200. As shown in FIG. 3, the eNB 200 includes an antenna 201, a radio transceiver 210, a network interface 220, a memory 230, and a processor 240. The memory 230 and the processor 240 configure a controller. Furthermore, the memory 230 may be integrally formed with the processor 240, and this set (that is, a chip set) may be called a processor 240'.

The antenna 201 and the radio transceiver 210 are used to transmit and receive the radio signal. The antenna 201 includes a plurality of antenna elements. The radio transceiver 210 converts the baseband signal output from the processor 240 into the radio signal, and transmits the radio signal from the antenna 201. Furthermore, the radio transceiver 210 converts the radio signal received by the antenna 201 into the baseband signal, and outputs the baseband signal to the processor 240.

The network interface 220 is connected to a neighboring eNB 200 via the X2 interface and is connected to the MME/S-GW 500 via the S1 interface. The network interface 220 is used in communication performed on the X2 interface and communication performed on the S1 interface.

The memory 230 stores a program to be executed by the processor 240 and information to be used for a process by the processor 240.

The processor 240 includes a baseband processor that performs modulation and demodulation, encoding and decoding, and the like on the baseband signal, and a CPU that performs various types of processes by executing the program stored in the memory 230. The processor 240 executes various types of processes and various types of communication protocols described later.

Figure 4:
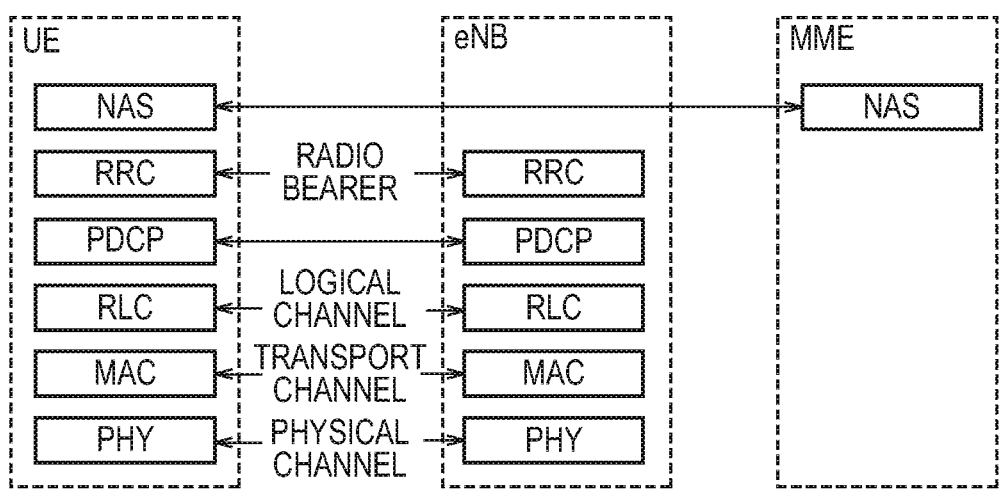
FIG. 4 is a protocol stack diagram of a radio interface in the LTE system.

FIG. 4 is a protocol stack diagram of a radio interface in the LTE system.

As shown in FIG. 4, the radio interface protocol is classified into a layer 1 to a layer 3 of an OSI reference model, wherein the layer 1 is a physical (PHY) layer. The layer 2 includes an MAC (Media Access Control) layer, an RLC (Radio Link Control) layer, and a PDCP (Packet Data Convergence Protocol) layer. The layer 3 includes an RRC (Radio Resource Control) layer.

The physical layer performs encoding and decoding, modulation and demodulation, antenna mapping and demapping, and resource mapping and demapping. The physical layer provides a transmission service to an upper layer by using a physical channel. Between the physical layer of the UE 100 and the physical layer of the eNB 200, data is transmitted via the physical channel.

The MAC layer performs priority control of data, a retransmission process by a hybrid ARQ (HARQ), and the like. Between the MAC layer of the UE 100 and the MAC layer of the eNB 200, data is transmitted via a transport channel. The MAC layer of the eNB 200 includes a transport format of an uplink and a downlink (a transport block size, a modulation and coding scheme (MCS), and the like), and an MAC scheduler to decide a resource block to be assigned.

The RLC layer utilizes the functions of the MAC layer and the physical layer to transmit data to an RLC layer at a reception side. Between the RLC layer of the UE 100 and the RLC layer of the eNB 200, data is transmitted via a logical channel.

The PDCP layer performs header compression and decompression, and encryption and decryption.

The RRC layer is defined only in a control plane. Between the RRC layer of the UE 100 and the RRC layer of the eNB 200, a control signal (RRC message) for various types of setting is transmitted. The RRC layer controls the logical channel, the transport channel, and the physical channel in response to establishment, re-establishment, and release of a radio bearer. When an RRC connection is established between the RRC of the UE 100 and the RRC of the eNB 200, the UE 100 is in a connected state, and when the RRC connection is not established, the UE 100 is in an idle state.

An NAS (Non-Access Stratum) layer positioned above the RRC layer performs session management, mobility management, and the like.

Figure 5:
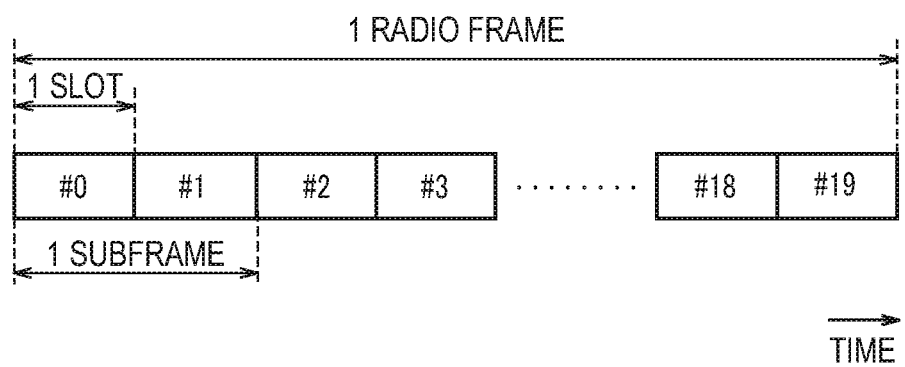
FIG. 5 is a configuration diagram of a radio frame used in the LIE system.

FIG. 5 is a configuration diagram of a radio frame used in the LTE system. In the LTE system, OFDMA (Orthogonal Frequency Division Multiplexing Access) is employed in a downlink, and SC-FDMA (Single Carrier Frequency Division Multiple Access) is employed in an uplink, respectively.

As shown in FIG. 5, the radio frame is configured by 10 subframes arranged in a time direction, wherein each subframe is configured by two slots arranged in the time direction. Each subframe has a length of 1 ms and each slot has a length of 0.5 ms. Each subframe includes a plurality of resource blocks (RBs) in a frequency direction, and a plurality of symbols in the time direction. Each symbol is provided at a head thereof with a guard interval called a cyclic prefix (CP). The resource block includes a plurality of subcarriers in the frequency direction. A radio resource unit configured by one subcarrier and one symbol is called a resource element (RE).

Among radio resources assigned to the UE 100, a frequency resource can be specified by a resource block and a time resource can be specified by a subframe (or a slot).

In the downlink, an interval of several symbols at the head of each subframe is a control region mainly used as a physical downlink control channel (PDCCH). Furthermore, the remaining interval of each subframe is a region that can be mainly used as a physical downlink shared channel (PDSCH). Moreover, in each subframe, cell-specific reference signals (CRSs) are distributed and arranged.

In the uplink, both ends in the frequency direction of each subframe are control regions mainly used as a physical uplink control channel (PUCCH). Furthermore, the center portion in the frequency direction of each subframe is a region that can be mainly used as a physical uplink shared channel (PUTSCH). Moreover, in each subframe, a demodulation reference signal (DMRS) and a sounding reference signal (SRS) are arranged.

(D2D Communication)

Next, description will be provided by comparing the D2D communication with the normal communication (cellular communication) of the LTE system.

Figure 6:
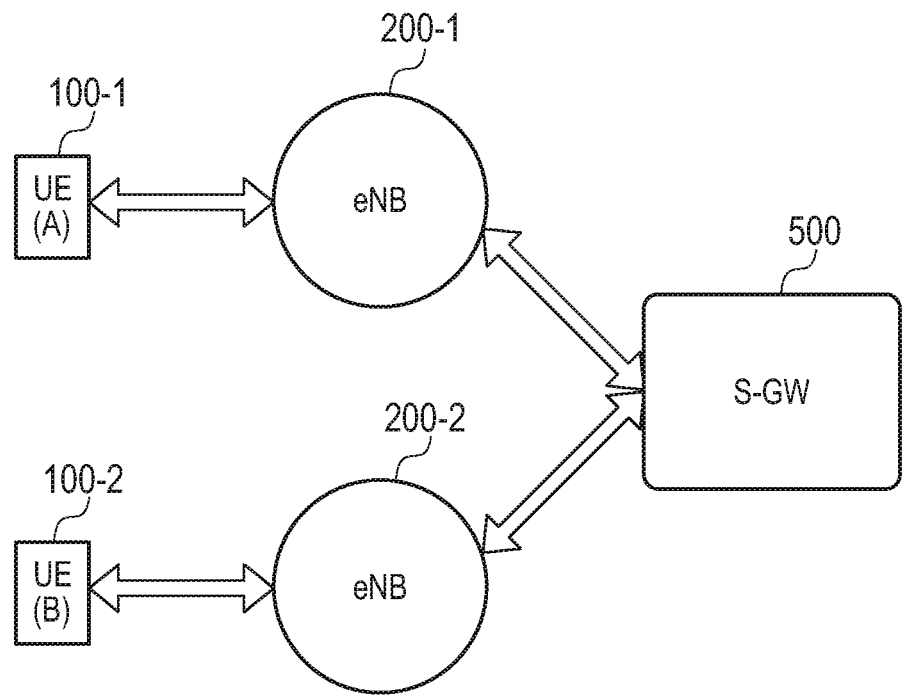
FIG. 6 is a diagram showing a data path in cellular communication.

FIG. 6 is a diagram showing a data path in the cellular communication. Here, a case is shown as an example in which the cellular communication is performed between UE 100-1 that establishes a connection with eNB 200-1 and UE 100-2 that establishes a connection with eNB 200-2. It is noted that the data path indicates a transfer path of user data (user plane).

As shown in FIG. 6, the data path of the cellular communication passes through the network. In particular, the data path is set to pass through the eNB 200-1, the S-GW 500, and the eNB 200-2.

Figure 7:
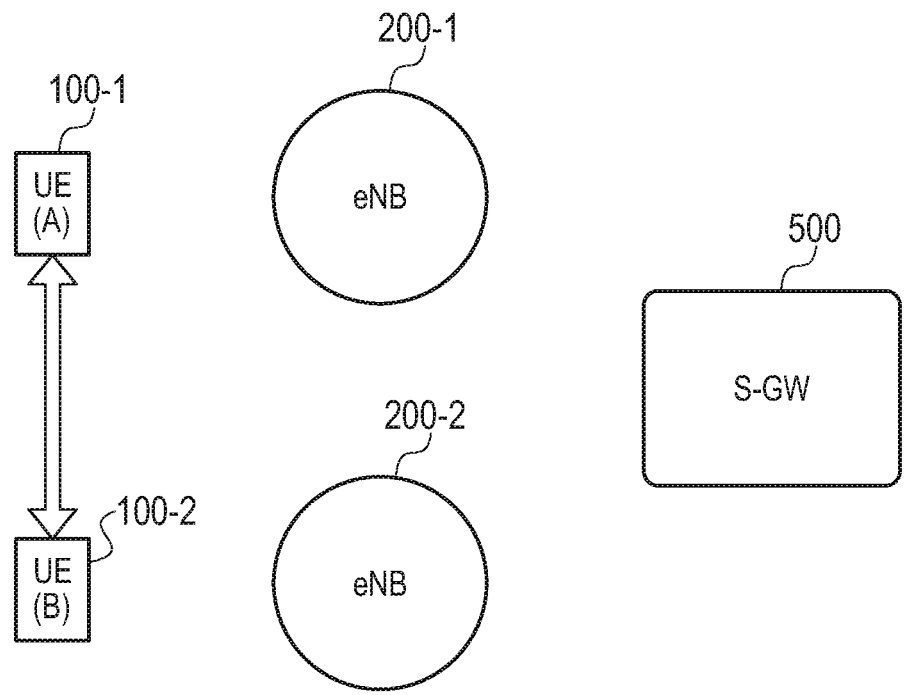
FIG. 7 is a diagram showing a data path in D2D communication.

FIG. 7 is a diagram showing a data path in the D2D communication. Here, a case is shown as an example in which the D2D communication is performed between the UE 100-1 that establishes a connection with the eNB 200-1 and the UE 100-2 that establishes a connection with the eNB 200-2.

For example, one UE 100 of the UE 100-1 and the UE 100-2 discovers the other UE 100 existing in the vicinity of the one UE 100, so that the D2D communication starts. It is noted that in order to start the D2D communication, the UE 100 has a (Discover) function of discovering the other UE 100 existing in the vicinity of the UE 100. Furthermore, the UE 100 has a (Discoverable) function of being discovered by the other UE 100.

As shown in FIG. 7, the data path of the D2D communication does not pass through the network. That is, direct radio communication is performed between the UEs. As described above, when the UE 100-2 exists in the vicinity of the UE 100-1, the D2D communication is performed between the UE 100-1 and the UE 100-2, thereby obtaining an effect that a traffic load on the network and a battery consumption amount of the UE 100 are reduced, for example.

(Schematic Operation of System According to First Embodiment)

Figure 8:
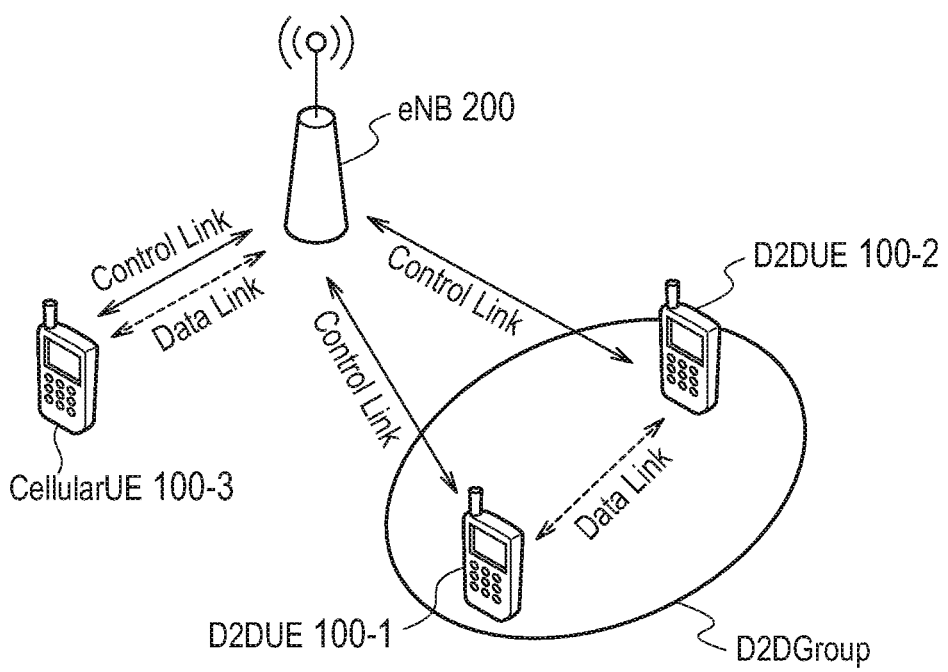
FIG. 8 is an explanatory diagram for illustrating a state of a mobile communication system according to the first embodiment.
Figure 9:
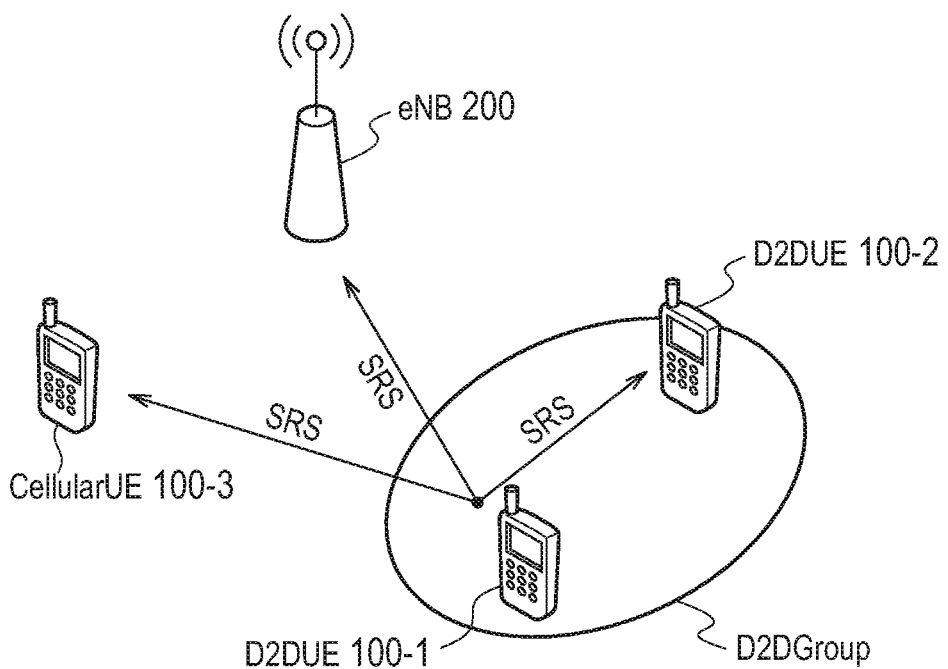
FIG. 9 is an explanatory diagram for illustrating a state of the mobile communication system according to the first embodiment.
Figure 10:
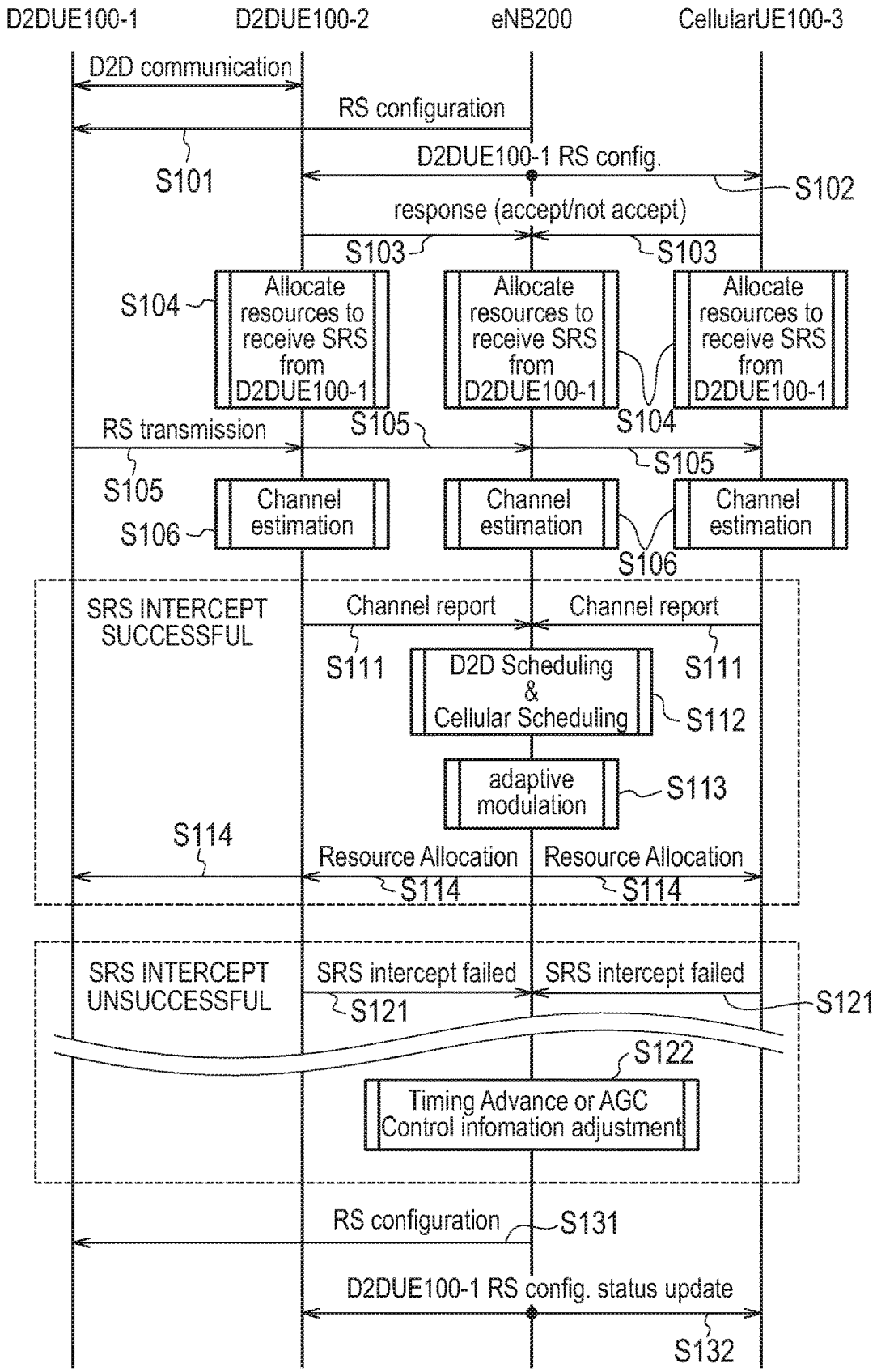
FIG. 10 is a sequence chart showing an operation example of the mobile communication system according to the first embodiment.

Next, by using FIG. 8 to FIG. 10, a schematic operation of a system according to the first embodiment will be described. FIG. 8 and FIG. 9 are explanatory diagrams for illustrating the state of the mobile communication system according to the first embodiment. FIG. 10 is a sequence chart showing an operation example of the mobile communication system according to the first embodiment.

In the present embodiment, as shown in FIG. 8, between the UE 100-1 (D2D UE 100-1) and the UE 100-2 (D2D UE 100-2), a link for exchanging data for D2D communication (Data Link) is provided. That is, the UE 100-1 and the UE 100-2 configure a D2D group (D2D Group). Further, between the UE 100-1 and the eNB 200 and between the UE 100-2 and the eNB 200, a link for controlling the D2D communication (Control Link) is provided. That is, under the control of the eNB 200, the UE 100-1 and the UE 100-2 perform the D2D communication.

Between the UE 100-3 (Cellular UE 100-3) and the eNB 200, a link for exchanging data for cellular communication (Data Link) and a link for controlling (Control Link) are provided. The UE 100-3 performs the cellular communication.

As shown in FIG. 10, in step 101, the eNB 200 transmits to the UE 100-1 reference signal configuration information (RS configuration) for setting a parameter of the uplink reference signal (SRS) to the UE 100-1. The UE 1004 receives the reference signal configuration information.

The eNB 200 regularly or irregularly (before starting D2D communication, during performing Discovery, and when there is a request for the reference signal configuration information, for example) transmits the reference signal configuration information. In the present embodiment, description proceeds with an assumption that the eNB 200 regularly transmits the reference signal configuration information.

The reference signal configuration information is information necessary for the eNB 200 to receive the uplink reference signal transmitted from the UE 100-1, and information in which the parameter of the reference signal transmitted by the UE 100-1 is designated.

Further, it is preferable that the eNB 200 performs scheduling of a radio resource to be assigned to each UE 100 (the UE 100-1 to the UE 100-3) so that the UE 100-2 and the UE 100-3 are capable of receiving the reference signal from the UE 100-1 in a time-frequency in which the reference signal is transmitted.

In step 102, the eNB 200 transmits the reference signal configuration information of the UE 100-1, to each of the UE 100-2 and the UE 100-3. Each of the UE 100-2 and the UE 100-3 receives the reference signal configuration information (D2DUE 100-1 RS config.) of the UE 100-1.

The reference signal configuration information of the UE 100-1 is information in which the parameter of the reference signal transmitted by the UE 100-1 is designated. Specifically, examples of the reference signal configuration information of the UE 100-1 include any one of: information on a timing setting of the reference signal (for example, a variable resulting from an SRS update cycle (SRSConfigurationIndex, etc.)), information on reception information of the reference signal (for example, SRS transmission bandwidth (SRS-BandWidthConfiguration, SRS-BandWidth, etc.), a cyclic shift, a transmission sinking comb (transmissionComb), hopping-related information (freqDomainPosition, SRS-HoppingBandWidth, etc.), a transmission antenna number), information on transmission power of the reference signal, path loss information between user terminals, and timing advance information. The reference signal configuration information of the UE 100-1 may be the same as the reference signal configuration information transmitted in step 101.

In step 103, each of the UE 100-2 and the UE 100-3 transmits a response to the reference signal configuration information of the UE 100-1, to the eNB 200. Specifically, each of the UE 100-2 and the UE 100-3 transmits information indicating whether or not the reference signal configuration information of the UE 100-1 is received, to the eNB 200. It is noted that when not being capable of receiving the reference signal of the UE 100-1, each of the UE 100-2 and the UE 100-3 may transmit, together with the response, a message that indicates not being capable of receiving, to the eNB 200. Description proceeds with an assumption that each of the UE 100-2 and the UE 100-3 receives the reference signal configuration information of the UE 100-1, below.

In step 104, each of the UE 100-2, the UE 100-3, and the eNB 200 assigns the radio resource to receive the reference signal from the UE 100-1.

It is noted that instead of the UE 100-2 and the UE 100-3 assigning the radio resource to receive the reference signal from the UE 100-1, the eNB 200 may assign the radio resource for the LIE 100-2 and the UE 100-3 to receive the reference signal, and notify the UE 100-2 and the UE 100-3 of the assigned radio resource.

In step 105, as shown in FIG. 9, the UE 100-1 transmits the reference signal (RS transmission). Each of the UE 100-2, the UE 100-3, and the eNB 200 receives the reference signal.

When a timing at which the UE 100-1 transmits the reference signal is detected on the basis of the reference signal configuration information of the UE 100-1, each of the UE 100-2 and the UE 100-3 switches a setting for receiving the reference signal from the UE 100-1.

In step 106, each of the respective nodes (the UE 100-2, the UE 100-3, and the eNB 200) measures a channel state (Channel estimation) between the UE 100-1 and the each node, on the basis of the received reference signal. That is, the UE 100-2 measures the channel state between the UE 100-1 and the UE 100-2. Likewise, the UE 100-3 measures the channel state between the UE 100-1 and the UE 100-3, and the eNB 200 measures the channel state between the UE 100-1 and the eNB 200.

When knowing the transmission power of the reference signal of the UE 100-1 and the pass loss between itself and the UE 100-1, each of the UE 100-2 and the UE 100-3 may control on the basis of the information to achieve appropriate received power by gain adjustment of AGC, etc.

When being capable of receiving the reference signal from the UE 100-1 to measure the channel state (when SRS interception is successful), each of the UE 100-2 and the UE 100-3 executes a process in step 111. On the other hand, when not being capable of measuring the channel state (when the SRS interception is unsuccessful), each of the UE 100-2 and the UE 100-3 executes a process in step 121.

Firstly, when the SRS interception is successful, in step 111, each of the UE 100-2 and the UE 100-3 transmits a Channel report indicating a channel state, to the eNB 200. The eNB 200 receives the Channel report from each of the UE 100-2 and the UE 100-3.

The Channel report may be the channel information itself (including a complex number (a+jb) or a complex matrix), or may be CQI (Channel Quality Indicator), and the Channel report may be a set of a plurality of high-ranking frequency bands out of frequency bands having a good characteristic. Specifically, the channel state may be information including at least any one of: CQI for each resource block (wideband or subband); several high-ranking resource blocks (wideband or subband) having a good characteristic; several high-ranking combinations between a resource block (wideband or subband) having a good characteristic, and CQI; several fixed number of resource blocks (wideband or subband) having a good characteristic; several high-ranking resource blocks (wideband or subband) having a good characteristic that exceed a set threshold value and; several high-ranking resource blocks (wideband or subband) having a poor characteristic; several high-ranking combinations between a resource block (wideband or subband) having a poor characteristic, and CQI; and several fixed number of resource blocks (wideband or subband) having a poor characteristic. Further, the Channel report includes information indicating an identifier of the UE 100 that transmits the Channel report, and an identifier of the UE 100 that transmits the reference signal.

A timing of the Channel report may be an arbitrary timing, and may comply with a previously determined condition (predefined condition) such as reporting after four subframes after receiving a reference signal, for example.

In step 112, the eNB 200 performs resource scheduling of D2D communication (D2D Scheduling) and resource scheduling of cellular communication (Cellular Scheduling), on the basis of the Channel report. For example, the eNB 200 determines the radio resource assignment so as to restrain the interference from the UE 100-1 to the eNB 200 allowing the UE 100-1 to perform beamforming to the UE 100-2.

In step 113, the eNB 200 executes control of an adaptive radio link (adaptive modulation), on the basis of the Channel report. Specifically, the eNB 200 determines a Rank number, precoding weight, and modulation method and channel Coding Rate, which are included in a modulation and coding scheme (MCS). As a result, the eNB 200 performs null steering reception on an interference signal from the UE 100-1, on the basis of the channel state. Further, the eNB 200 is capable of controlling so that the UE 100-1 directs a beam toward the UE 100-2 and a null toward the eNB 200 and the UE 100-3, on the basis of the channel state. Further, the eNB 200 is capable of controlling, on the basis of the channel state, so that the UE 100-3 performs the null steering reception on the interference signal from the UE 100-1, and when the UE 100-3 performs transmission, is capable of controlling, on the basis of the channel state, to direct a null toward the UE 100-1 and/or the UE 100-2.

It is noted that the scheduling in the present invention (scope of claims) includes not only the scheduling in step 112 but also the execution of the control of the adaptive radio link (adaptive modulation) in the step 113.

In step 114, the eNB 200 notifies each UE 100 of the radio resource assigned in step 112 to each UE 100 (each of the UE 100-1, the UE 100-2, and the UE 100-3). Further, the eNB 200 may transmit a precoder matrix determined in step 113, to each UE 100.

Each of the respective UEs 100 uses the radio resource (and the control information determined in step 113) received from the eNB 200 to perform D2D communication or cellular communication.

On the other hand, when the SRS interception is unsuccessful, in step 121, each of the UE 100-2 and the UE 100-3 notifies failure information indicating that reception (interception) of the reference signal is failed. The eNB 200 receives the failure information.

It is noted that each of the UE 100-2 and the UE 100-3 may not necessarily notify the failure information. For example, when the Channel report is notified in accordance with a previously determined condition (predefined condition), each of the UE 100-2 and the UE 100-3 may not need to notify the failure information.

In step 122, the eNB 200 that receives the failure information adjusts at least any one of: a timing advance for adjusting a timing at which the reference signal from the UE 100-1 is received; adjustment of transmission power of the reference signal of the UE 100-1; and control information of AGC for controlling the received power of the reference signal from the UE 100-1, so that each of the UE 100-2 and the UE 100-3 is capable of receiving the reference signal from the UE 100-1. It is noted that the eNB 200 may not need to perform the adjustment.

In step 131, the eNB 200 transmits to the UE 100-1 in much the same way as in step 101. The UE 100-1 receives the reference signal configuration information. In the reference signal configuration information, adjustment information of the transmission power of the reference signal of the UE 100-1 may be included.

In step 132, the eNB 200 transmits the reference signal configuration information of the UE 100-1, to each of the UE 100-2 and the UE 100-3. The eNB 200 may transmit information updated from the reference signal configuration information in step 102. Further, the eNB 200 may transmit the timing advance or the AGC control information adjusted in step 122.

Processes afterward correspond to processes after step 103.

(Schematic Operation of System According to Modification of First Embodiment)

Next, by using FIG. 11, a schematic operation of a system according to a modification of the first embodiment will be described. FIG. 1I is a sequence chart showing an operation example of the mobile communication system according to the modification of the first embodiment. It is noted that a description will be provided while focusing on a portion different from the above-described embodiment, and a description of a similar portion will be omitted, where necessary.

In the above-described embodiment, the eNB 200 regularly transmits the reference signal configuration information of the UE 100-1 to each UE 100 other than the UE 100-1. In the present modification, in response to a request of the UE 100, the eNB 200 transmits the reference signal configuration information of the UE 100-1, to the UE 100.

Further, in the present modification, the UE 100-1 (D2DUE 100-1 (Master)) has a capability of performing the scheduling of D2D communication. That is, in the present modification, the UE 100-1 that performs the D2D communication, rather than the eNB 200, performs the scheduling for D2D communication. Specifically, in the present modification, the UE 100-1 determines by itself frequency resources to be used for the D2D communication, and starts the D2D communication with the UE 100-2 by using the determined frequency resources without receiving further allocations of frequency resources for the D2D communication by the eNB 200. Further, in the above-described embodiment, between the UE 100-1 and the eNB 200 and between the UE 100-2 and the eNB 200, a link for controlling the D2D communication (Control Link) is provided; however, in the present modification, between the UE 100-1 and the UE 100-2, a link for controlling the D2D communication (Control Link) is provided.

Figure 11:
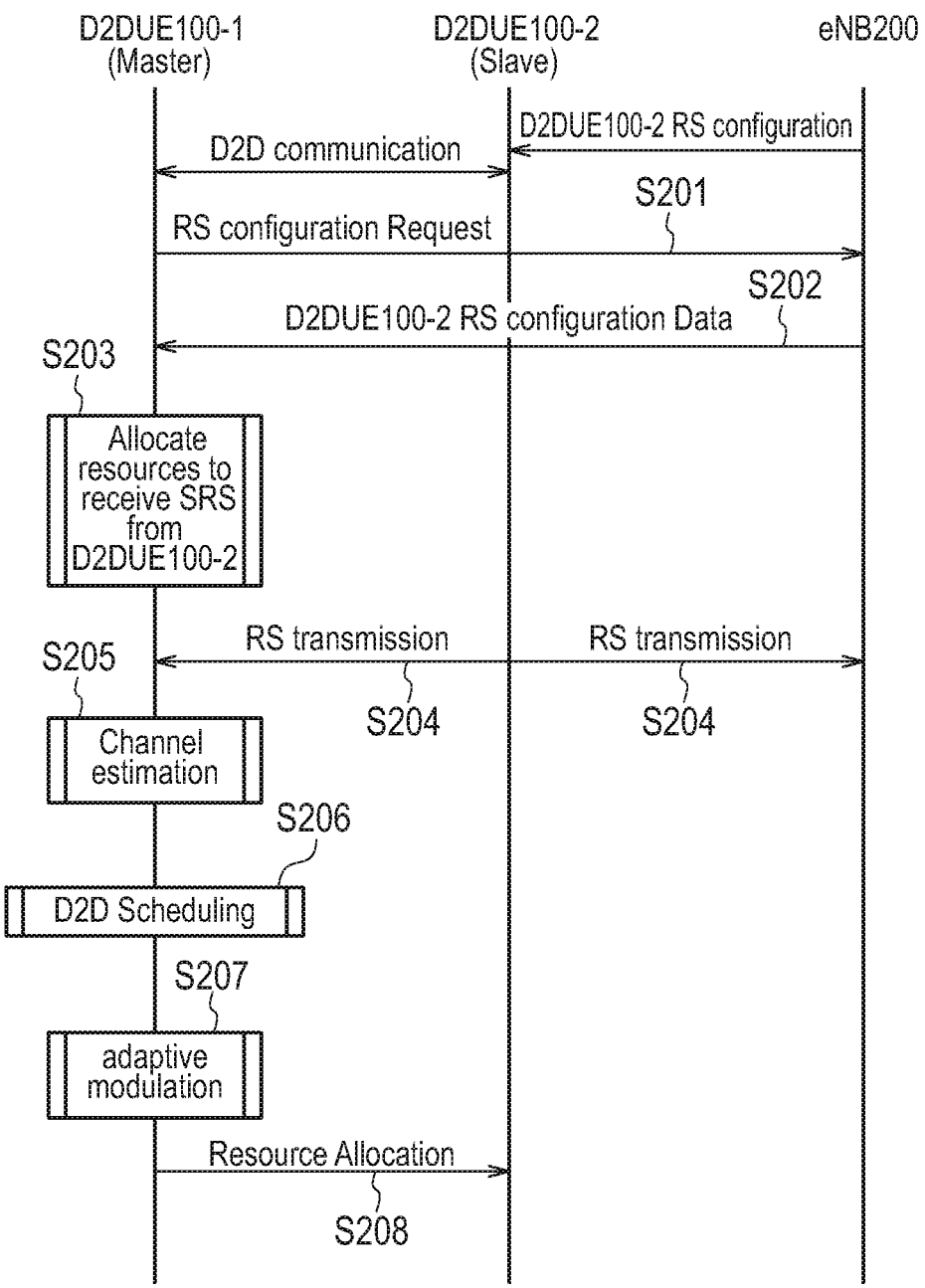
FIG. 11 is a sequence chart showing an operation example of the mobile communication system according to a modification of the first embodiment.

As shown in FIG. 11, the eNB 200 transmits reference signal configuration information of the UE 100-2 to the UE 100-2, and the UE 100-2 receives the reference signal configuration information of the UE 100-2. Further, the UE 100-1 (D2DUE 100-1 (Master)) and the UE 100-2 (D2DUE 100-2 (Slave)) perform the D2D communication.

In step 201, the UE 100-1 transmits a reference signal configuration information request (RS configuration Request) of the UE 100-2, to the eNB 200. The eNB 200 receives the reference signal configuration information request. The reference signal configuration information request is to request the reference signal configuration information of the UE 100 (UE 100-2) that is different from the UE 100 (UE 100-1) which transmits the request.

In step 202, the eNB 200 transmits the reference signal configuration information of the UE 100-2, to the UE 100-1, on the basis of the reference signal configuration information request. The UE 100-1 receives the reference signal configuration information.

Steps 203 to 205 correspond to steps 104, 105, and 106 in the first embodiment.

In step 206, in much the same way as in step 112 of the first embodiment, the UE 100-1 performs the scheduling of the D2D communication, on the basis of the channel state measured in step 205. Specifically, the radio resource used in the D2D communication is assigned to the UE 100-1 and the UE 100-2.

In step 207, in much the same way as in step 113 of the first embodiment, on the basis of the measured channel state, control of the adaptive radio link is executed on the UE 100-1 and the UE 100-2.

It is noted that when the UE 100-1 and the UE 100-2 are equal in the number of transmission and reception antennas, a channel estimation from the UE 100-2 to the UE 100-1 becomes possible due to the channel reversibility. Therefore, when the UE 100-1 and the UE 100-2 are equal in the number of transmission and reception antennas, the scheduling of the D2D communication in steps 206 and 207 are performed on the basis of the channel state measured in step 205. That is, even when the scheduling is performed in consideration of the channel state from the UE 100-2 to the UE 100-1, the UE 100-2 is capable of omitting a process in which the reference signal from the UE 100-1 is received to measure the channel state and the measured result is transmitted to the UE 100-1.

In step 208, the scheduling result of the D2D communication in steps 206 and 207 is transmitted to the UE 100-2. The UE 100-2 receives the scheduling result.

Each of the UE 100-1 and the UE 100-2 performs the D2D communication by utilizing the assigned radio resource on the basis of the scheduling result, and performs the beamforming to direct the beam to a partner terminal.

Summary of First Embodiment

In the present embodiment, the eNB 200 transmits the reference signal configuration information designating the parameter of the uplink reference signal to each of the respective UEs 100 (the UE 100-2 and the UE 100-3). The UE 100-1 transmits the uplink reference signal to the eNB 200. Each UE 100 receives the uplink reference signal transmitted from the UE 100-1 on the basis of the reference signal configuration information to measure the channel state between each UE 100 and the UE 100-1. As a result, only when the existing uplink reference signal (SRS) is transmitted to the eNB 200 as conventionally, the UE 100-1 is capable of measuring the channel state among each UE 100 without a need of transmitting the reference signal designed to measure the channel state to each UE 100. This eliminates a need for the UE 100-1 to individually transmit the reference signal to each UE 100 to measure the channel state among each UE 100. Further, when the existing reference signal is shared to measure the channel state among each UE 100, it is not necessary to define a new reference signal, and thus, it is possible to restrain the use of a radio resource as a result of using both the existing reference signal and the new reference signal. Thus, it is possible to measure the channel state from the UE 100-1 while restraining the radio resource from being oppressed in view of a whole system.

It is noted that the SRS originally is a reference signal to the eNB 200, and thus, the UE 100-1 does not transmit the SRS toward the UE 100-2 and the UE 100-3. Therefore, it is thought that the UE 100-2 and the UE. 100-3 intercept the SRS. Naturally, the UE 100-1 may transmit the SRS not only to the eNB 200 but also to other nodes including the UE 100-2 and the UE 100-3.

Further, in the present embodiment, each UE 100 (the UE 100-2 and the UE 100-3) transmits channel state information to the eNB 200, and the eNB 200 performs, for the D2D communication, the scheduling of the UE 100-1 and the UE 100-2 on the basis of the channel state information. As a result, the scheduling is performed on the basis of the channel state between the UE 100-1 and the UE 100-2, and thus, the UE 100-1 and the UE 100-2 are capable of performing the D2D communication while restraining the interference.

Further, in the present embodiment, the eNB 200 receives the uplink reference signal to measure the channel state between the eNB 200 and the UE 100-1, and the eNB 200 performs, for the beamforming and/or the null steering to the UE 100, the scheduling of the UE 100 on the basis of the channel state between the UE 100-1 and the UE 100-2 and/or the channel state between the eNB 200 and the UE 100-1. As a result, the eNB 200 is capable of restraining the reception of the interference signal from the UE 100, for example.

Further, in the modification of the present embodiment, the UE 100-1 performs the scheduling of the D2D communication on the basis of the channel state measured by the UE 100-1. As a result, the UE 100-1 is capable of well receiving a signal in the D2D communication from the UE 100-2.

Further, in the modification of the present embodiment, the UE 100-1 requests a transmission of the reference signal configuration information of the UE 100-1, and the eNB 200 transmits the reference signal configuration information on the basis of the request of the transmission of the reference signal configuration information. As a result, the eNB 200 needs to transmit the reference signal configuration information only when there is the request, and thus, it is possible to eliminate a need of transmitting the reference signal configuration information to a communication device not intended to receive the reference signal configuration information of the UE 100-1.

Second Embodiment

Next, with reference to the accompanying drawing, an embodiment will be described in which a cellular communication system (LTE system) configured to comply with the 3GPP standards is cooperated with a radio LAN (WLAN) system. It is noted that a description will be provided while focusing on a portion different from the above-described embodiment, and a description of a similar portion will be omitted, where necessary.

(System Configuration)

Figure 12:
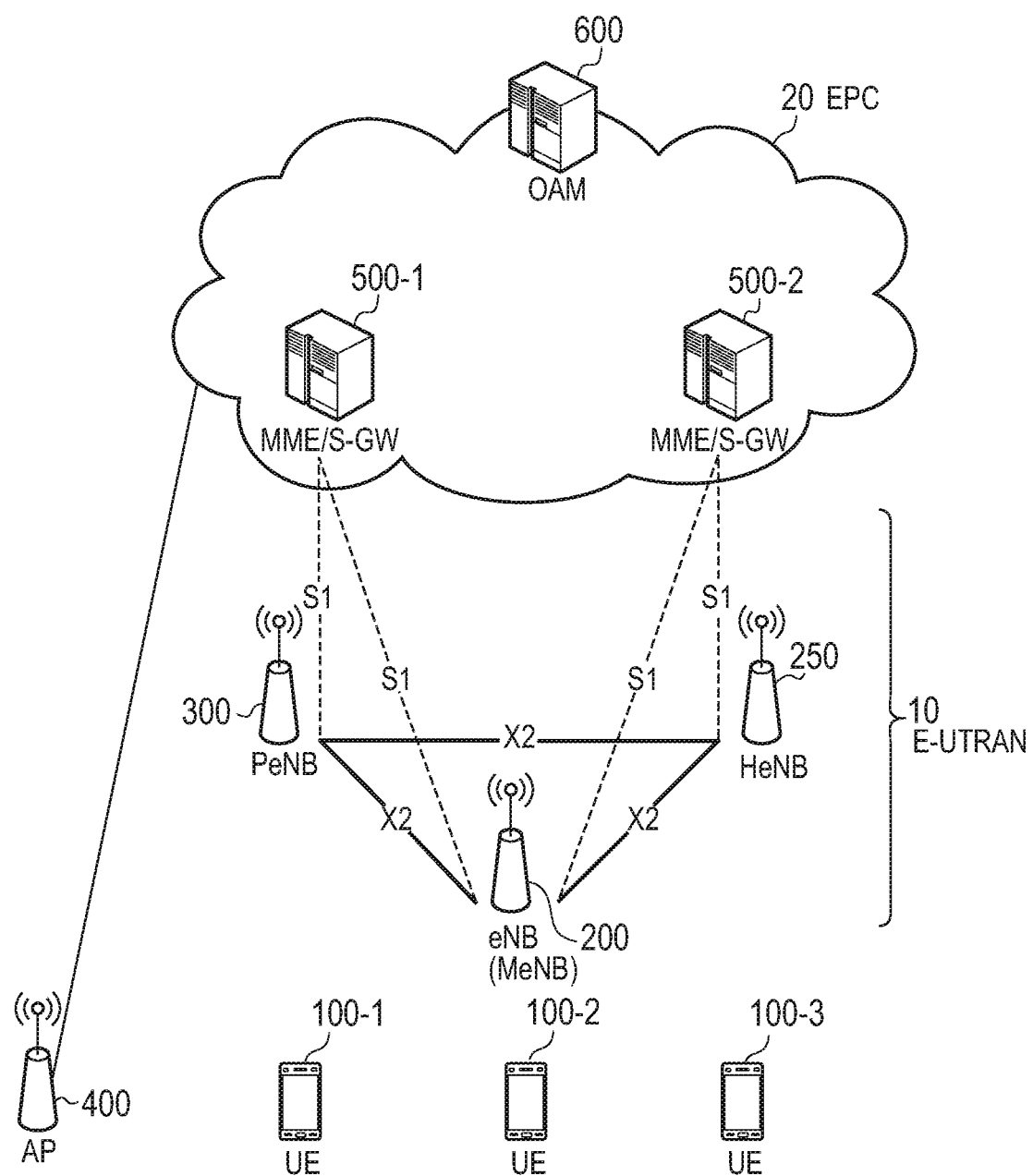
FIG. 12 is a system configuration diagram according to a second embodiment.

FIG. 12 is a system configuration diagram according to the second embodiment.

The UE 100 is a mobile-type radio communication device and performs radio communication with a cell with which a connection is established. The UE 100 corresponds to a user terminal. The UE 100 is a terminal (dual terminal) that supports both communication schemes of cellular communication and WLAN communication.

The E-UTRAN 10 includes the eNB 200 (evolved Node-B), HeNB 250 (Home evolved Node-B), and PeNB 300 (Peco evolved Node-B). The eNB 200, the HeNB 250, and the PeNB 300 correspond to a cellular base station.

The eNB 200, the HeNB 250, and the PeNB 300 manage one or a plurality of cells, and perform radio communication with the UE 100 which establishes a connection (RRC connection) with their own cells. It is noted that the eNB 200 manages a large cell, the HeNB 250 manages a specific cell (small cell) having a narrower cover range than the large cell, and the PeNB 300 manages a small cell having a narrower cover range than the large cell.

The specific cell is called a "CSG cell", a "hybrid cell", or an "open cell" according to set access mode.

The CSG cell is a cell accessible only by a UE 100 (called a "member UE") having an access right, and broadcasts a CSG ID. The UE 100 holds a list (white list) of CSG ID of the CSG cell for which the UE 100 has an access right, and determines the presence or absence of access right on the basis of the white list and the CSG ID broadcast by the CSG cell.

The hybrid cell is a cell in which the member UE is more advantageously treated as compared with the non-member UE, and broadcasts information indicating that the hybrid cell is a cell released also to the non-member UE, in addition to the CSG ID. The UE 100 determines the presence or absence of access right on the basis of the white list and the CSG ID broadcasted by the hybrid cell.

The open cell is a cell in which the UE 100 is equivalently treated regardless of whether or not the UE 100 is a member, and does not broadcast the CSG ID. In view of the UE 100, the open cell is equal to a cell.

It is noted that the "cell" is used as a term indicating a minimum unit of a radio communication area, and is also used as a term indicating a function of performing radio communication with the UE 100. Further, the eNB 200 has a radio resource management (RRM) function, a routing function of user data, and a measurement control function for mobility control and scheduling, for example.

The eNB 200 is connected mutually via the X2 interface. Further, the eNB 200 is connected via the S1 interface to the MME/S-GW 500 included in the EPC 20. Also the HeNB 250 and the PeNB 300 are mutually connected via the X2 interface in much the same way as the eNB 200. Further, the eNB 200 and the PeNB 300 are connected via the X2 interface.

The WLAN system includes WLAN AP (hereinafter, "AP") 400. The WLAN system is configured to comply with various IEEE 802.11 specifications, for example. The AP 400 communicates with the UE 100 in a frequency band (MILAN frequency band) different from a cellular frequency band. The AP 400 is connected to the EPC 20 via a router, etc.

Next, the configurations of the UE 100 and the AP 400 will be described. It is noted that the configurations of the HeNB 250 and the PeNB 300 is in much the same way as the eNB 200 in the above-described first embodiment.

FIG. 13 is a block diagram of the UE 100. As shown in FIG. 13, the UE 100 includes: antennas 101 and 102; a cellular transceiver (cellular communication unit) 115; a WLAN transceiver (radio LAN communication unit) 112; a user interface 120; a GNSS (Global Navigation Satellite System) receiver 130; a battery 140; a memory 150; and a processor 160. The UE 100 is configured in much the same way as the UE 100 in the above-described first embodiment other than the WLAN transceiver (radio LAN communication unit) 112.

The cellular transceiver 115 is for implementing the both communications, that is, not only the cellular communication but also the D2D communication. The cellular transceiver 115 corresponds to the radio transceiver 110 of the first embodiment.

The antenna 102 and the WLAN transceiver 112 are used to transmit and receive a WLAN radio signal. The WLAN transceiver 112 converts the baseband signal output from the processor 160 into the WLAN radio signal, and transmits the same from the antenna 102. Further, the WLAN transceiver 112 converts the WLAN radio signal received by the antenna 102 into the baseband signal, and outputs the same to the processor 160.

FIG. 14 is a block diagram of the AP 400. As shown in FIG. 14, the AP 400 includes: antennas 401 and 402; a cellular transceiver (cellular communication unit) 410; a WLAN transceiver (radio LAN communication unit) 412; a network interface 420; a memory 430; and a processor 440.

The antenna 401 and the cellular transceiver 410 are used to transmit and receive a cellular radio signal. The cellular transceiver 410 converts the baseband signal output from the processor 440 into the cellular radio signal, and transmits the same from the antenna 401. Further, the cellular transceiver 410 converts the cellular radio signal received by the antenna 401 into the baseband signal, and outputs the same to the processor 440.

In the present embodiment, the antenna 401 and the cellular transceiver 410 are used to receive the reference signal from the UE 100. It is noted that the AP 400 may include a receiver used to receive the reference signal, instead of the cellular transceiver 410.

The antenna 402 and the WLAN transceiver 412 are used to transmit and receive the WLAN radio signal. The WLAN transceiver 410 converts the baseband signal output from the processor 440 into the WLAN radio signal, and transmits the same from the antenna 401. Further, the WLAN transceiver 410 converts the WLAN radio signal received by the antenna 401 into the baseband signal, and outputs the same to the processor 440.

The network interface 420 is connected to the EPC 20 via a router, etc. Further, the network interface 420 is used for communication with the eNB 200 via the EPC 20.

The memory 430 stores a program to be executed by the processor 440 and information to be used for a process by the processor 440. The processor 440 includes a baseband processor that performs modulation and demodulation, encoding and decoding, and the like on the baseband signal, and a CPU that performs various types of processes by executing the program stored in the memory 430. The processor 440 executes various types of processes and various types of communication protocols described later.

Furthermore, the memory 430 may be integrally formed with the processor 440, and this set (that is, a chip set) may be called the processor 440'.

(Schematic Operation of System According to Second Embodiment)

Figure 15:
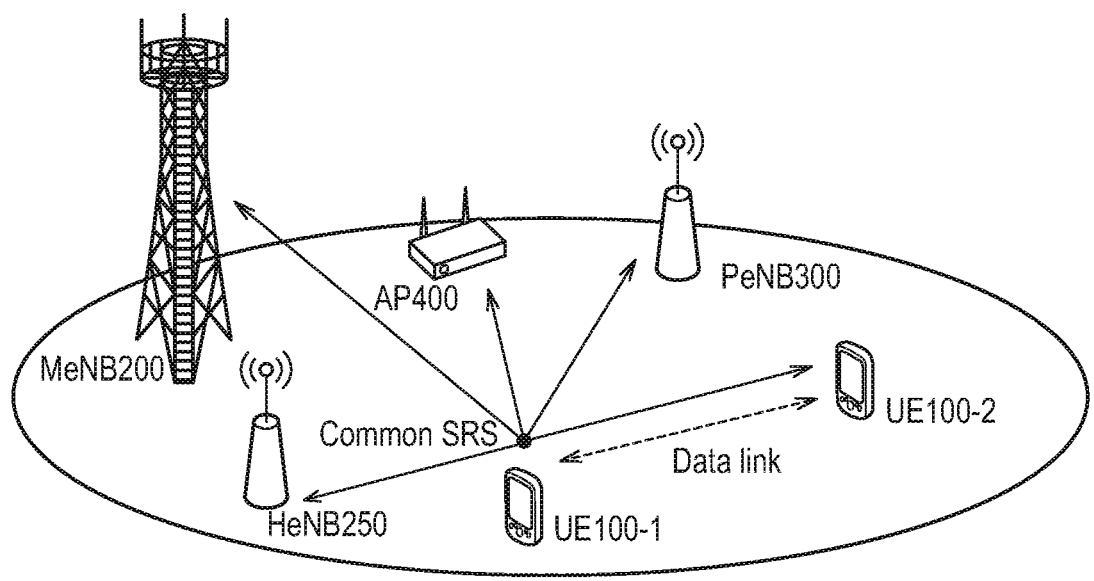
FIG. 15 is an explanatory diagram for illustrating a state of the mobile communication system according to the second embodiment.
Figure 16:
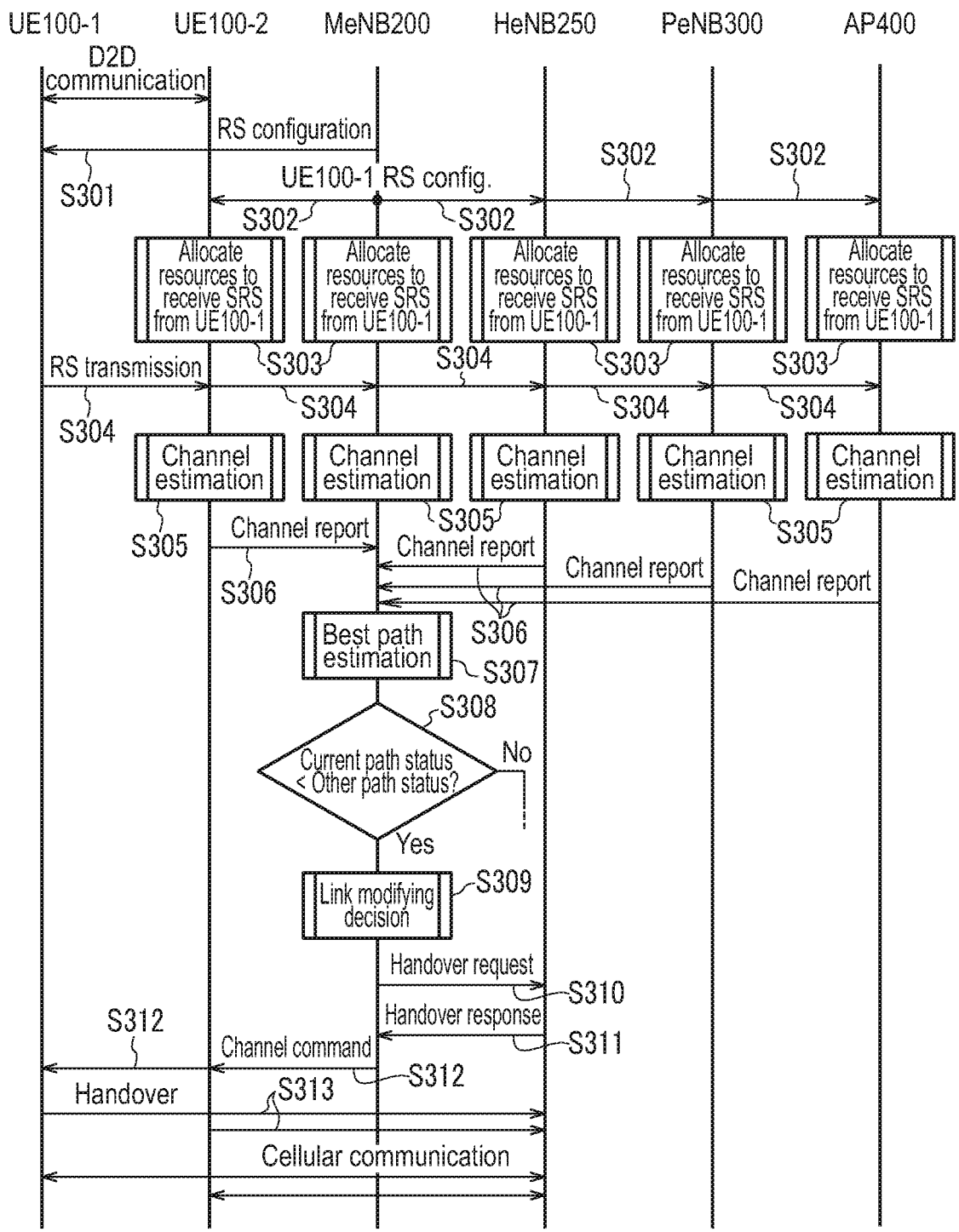
FIG. 16 is a sequence chart showing an operation example of the mobile communication system according to the second embodiment.

Next, by using FIG. 15 and FIG. 16, a schematic operation of a system according to the second embodiment will be described. FIG. 15 is an explanatory diagram for illustrating a state of the mobile communication system according to the second embodiment. FIG. 16 is a sequence chart showing an operation example of the mobile communication system according to the first embodiment. It is noted that a description will be provided while focusing on a portion different from the above-described embodiment, and a description of a similar portion will be omitted, where necessary.

In the above-described first embodiment, the reference signal from the UE 100-1 is received by the UE 100-2, the UE 100-3, and the eNB 200; however, in the present embodiment, as shown in FIG. 15, the reference signal (Common SRS) from the UE 100-1 is received by the UE 100-2, the eNB 200 (the MeNB 200, the HeNB 250, and the PeNB 300), and the AP 400.

In the present embodiment, as shown in FIG. 15, between the UE 100-1 and the UE 100-2, a link for exchanging data for D2D communication (Data Link) is provided. It is noted that the UE 100-1 and the UE 100-2 establish a connection (RRC connection) with a cell managed by the eNB 200 or a connection at least with a C-plane (control plane).

It is noted that in the present embodiment, the MeNB 200 includes a determination device that selects a connection target of the UE 100-1. Therefore, the MeNB 200 executes processes in steps 307 to 309 described later.

As shown in FIG. 16, steps. 301 to 306 correspond to steps 101, 102, 104 to 106, and 111 in the first embodiment.

It is noted that in step 302, the MeNB 200 notifies the AP 400 of the reference signal configuration information of the UE 100-1. The AP 400 receives the reference signal configuration information of the UE 100-1. The AP 400 may receive the reference signal configuration information of the UE 100-1 by way of a network, may receive the same directly from the MeNB 200 by the cellular transceiver 410, or may receive the same by way of the UE 100. Further, in step 304, the AP 400 receives the reference signal from the UE 100-1. In the present embodiment, the AP 400 receives by the cellular transceiver 410 the reference signal from the UE 100-1. Further, in step 306, the AP 400 performs the Channel report to the eNB 200.

It is noted that measuring the channel state in step 305 includes measuring received power of the reference signal. It is noted that when a received frequency of the reference signal and an actual communication frequency are different, a frequency correction (conversion) may be implemented on the measured value.

In step 306, the Channel report transmitted from each communication device (the UE 100-2, the HeNB 250, the PeNB 300, and the AP 400) to the MeNB 200 include information necessary for estimating an optimal path described later. For example, the Channel report includes information on the received power of the measured reference signal. It is noted that the Channel report includes information indicating an identifier (a cell ID, an AP identifier, and a UE identifier) of the communication device that transmits (notifies) the Channel report, and an identifier of the UE 100 that transmits the reference signal.

Further, each communication device may transmit (notify), together with the Channel report, communication information on communication of each communication device. Here, the communication information is information used for estimating the optimal path described later. The communication information may include information indicating any one of: a link category (LTE, D2D, WLAN, etc.), a load status (a level of capacity margin, resources usage rate) of the communication device, a carrier frequency that can be actually provided by the communication device, for example.

In step 307, the MeNB 200 estimates the optimal path on the basis of the Channel report reported in step 306. Specifically, the MeNB 200 estimates a path having good communication quality from the UE 100-1 to the UE 100-2 when the UE 100-1 performs communication with the UE 100-2 while being connected with each communication device. That is, in the present embodiment, the MeNB 200 calculates an estimated value of communication quality in the current D2D communication, an estimated value of communication quality in the cellular communication via the MeNB 200, an estimated value of communication quality in the cellular communication via the HeNB 250, an estimated value of communication quality in the cellular communication via the PeNB 300, and an estimated value of communication quality in the radio communication via the AP 400. For example, the MeNB 200 calculates an estimated value of communication quality of each communication device on the basis of the received power of each communication device included in the Channel report.

When receiving the communication information, the MeNB 200 may determine an optimal connection target, on the basis not only of the Channel report but also of the communication information. For example, on the basis of the link category and the load status of the communication device, throughput may be calculated, and taking into consideration the throughput of each communication device, the estimated value of a communication quality of each communication device may be calculated.

Further, the MeNB 200 may estimate a path having the optimal communication quality when the AP 400, which has a different communication scheme, takes into consideration the frequency that can be actually applied. That is, when the UE 100-1 performs communication with the UE 100-2 via the AP 400, an optimal path may be estimated after converting a frequency band used when the reference signal is actually transmitted, into a frequency band used by the UE 100-1.

In step 308, the MeNB 200 determines whether or not the current path state is smaller than another path state. When determining on the basis of this determination that the communication quality in the current D2D communication is poorer than the communication quality in communication that passes through another communication device (in a case of Yes), the MeNB 200 executes a process in step S309. On the other hand, when determining that the communication quality in the current D2D communication is better than the communication quality in communication that passes through another communication device (in a case of No), the MeNB 200 determines that the current connection target is the optimal connection target, and ends the process.

In step 309, the MeNB 200 determines to change the connection target to select the optimal connection target. Specifically, the MeNB 200 determines a communication device having the optimal communication quality, as the connection target.

In the present embodiment, description proceeds with an assumption that the MeNB 200 determines the communication quality that passes through the PeNB 300 is the optimal. The MeNB 200 executes the following process to cause the UE 100-1 to perform cellular communication that passes through the PeNB 300.

In step 310, the MeNB 200 transmits a handover request (Handover request) to the PeNB 300. The PeNB 300 receives the handover request.

In step 311, the PeNB 300 transmits a handover response (Handover response) to the MeNB 200, in response to the handover request. In the present embodiment, description proceeds with an assumption that the PeNB 300 permits the handover request.

In step 312, the MeNB 200 transmits a channel command to each of the UE 100-1 and the UE 100-2 so that the cellular communication is performed via the PeNB 300.

In step 313, each of the UE 100-1 and the UE 100-2 executes a handover to the PeNB 300. Thereafter, each of the UE 100-1 and the UE 100-2 performs cellular communication that passes through the PeNB 300.

(Schematic Operation of System According to Modification of Second Embodiment)

Figure 17:
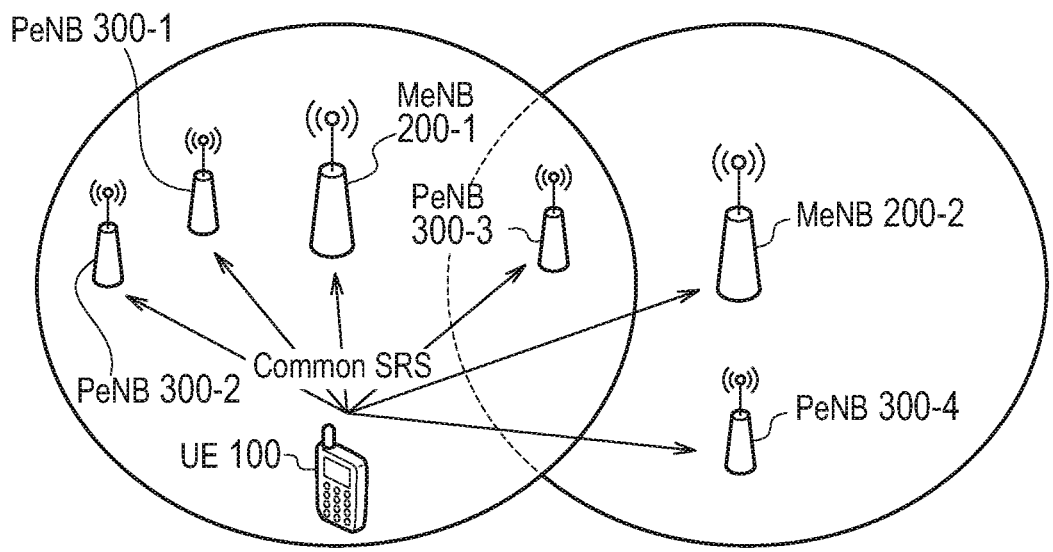
FIG. 17 is an explanatory diagram for illustrating a state of the mobile communication system according to a modification of the second embodiment.
Figure 18:
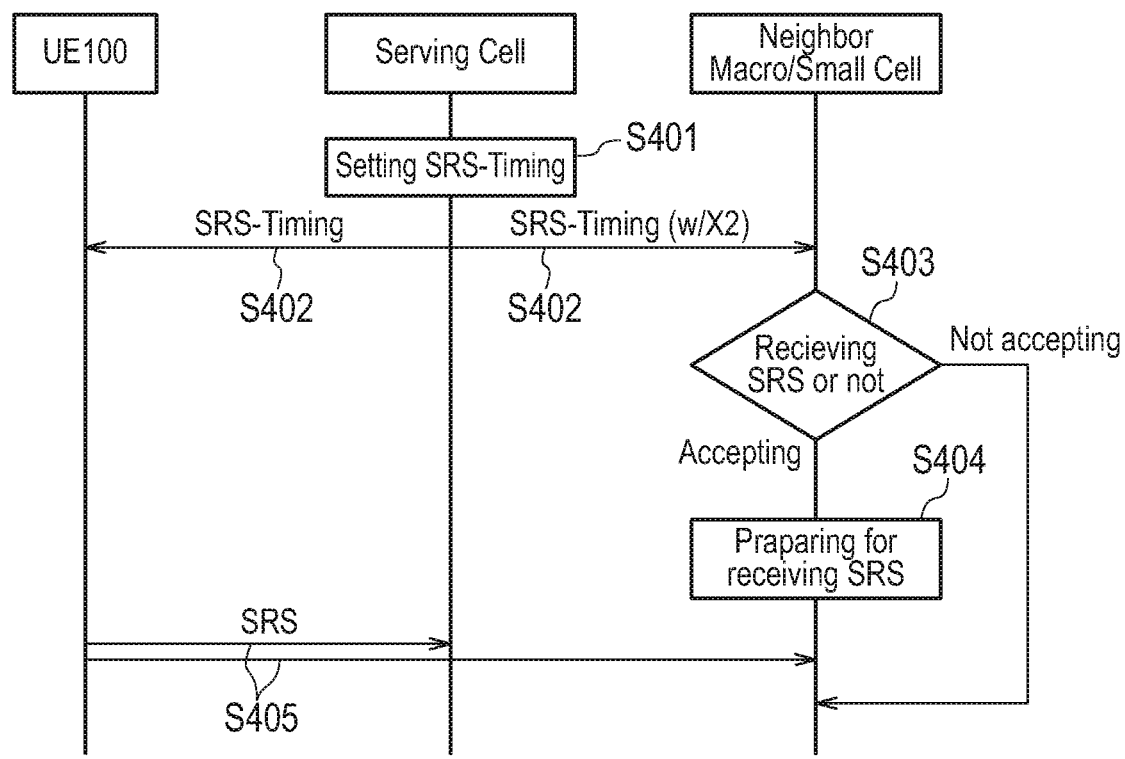
FIG. 18 is a sequence chart showing an operation example of the mobile communication system according to the modification of the second embodiment.

Next, by using FIG. 17 and FIG. 18, a schematic operation of a system according to a modification of the second embodiment will be described. FIG. 17 is an explanatory diagram for illustrating a state of the mobile communication system according to the modification of the second embodiment. FIG. 18 is a sequence chart showing an operation example of the mobile communication system according to the modification of the second embodiment. It is noted that a description will be provided while focusing on a portion different from the above-described embodiment, and a description of a similar portion will be omitted, where necessary.

As shown in FIG. 17, in the present modification, the MeNB 200-2 adjacent to the MeNB 200-1 to which the UE 100 is connected and PeNB 300-4 located within a cell managed by the eNB 200-2 also receive the reference signal (SRS) from the UE 100.

As shown in FIG. 18, in step 401, the MeNB 200-1 (serving cell) sets a transmission timing of the reference signal of the UE 100.

In step 402, the MeNB 200-1 notifies the UE 100, the MeNB 200-2 (Neighbor Macro Cell), and the PeNB 300-4 (Neighbor Small Cell) of the set transmission timing of the reference signal of the UE 100. The MeNB 200-1 may notify the UE 100 of the transmission timing of the reference signal of the UE 100 by including the same into the reference signal configuration information of the UE 100. Further, the MeNB 200-1 may notify, via the X2 interface, the MeNB 200-2 and the PeNB 300-4 of the transmission timing of the reference signal of the UE 100 by including the same into the reference signal configuration information of the UE 100.

It is noted that the MeNB 200-1 may transmit the set transmission timing of the reference signal of the UE 100-1 not only to the neighboring MeNB 200-2 and PeNB 300-4, but also to PeNB 300-1 to PeNB 300-3 located within the cell managed by the MeNB 200-1.

The set transmission timing of the reference signal of the LIE 100 is used for adjusting a timing at which the reference signal of the UE 100 is received. It is noted that the MeNB 200-1 may notify a timing advance value that is a correction value for receiving, by each of the MeNB 200-2 and the PeNB 300-4, the reference signal of the UE 100, instead of the set transmission timing of the reference signal of the UE 100.

In step 403, each of the MeNB 200-2 and the PeNB 300-4 determines whether or not to receive the reference signal from the UE 100. When setting the same reference signal configuration information as the reference signal configuration information of the UE 100 located in the cell managed by the MeNB 200-1, to the UE located within the cell managed by the MeNB 200-2, for example, the MeNB 200-2 may determine to not receive the reference signal from the UE 100.

When determining to not receive the reference signal from the UE 100 (Not accepting), each of the MeNB 200-2 and the PeNB 300-4 ends the process. On the other hand, when determining to receive the reference signal from the UE 100 (Accepting), each of the MeNB 200-2 and the PeNB 300-4 executes the process in step 404.

In step 404, each of the MeNB 200-2 and the PeNB 300-4 prepares for receiving the reference signal from the UE 100-1 on the basis of the transmission timing of the reference signal of the UE 100 notified from the MeNB 200-1.

In step S405, the UE 100 transmits the reference signal. The MeNB 200-1, the MeNB 200-2, and each PeNB 300 receive the reference signal from the UE 100, on the basis of the reference signal configuration information.

Processes after this point are in much the same way as in the above-described second embodiment.

It is noted that in order to implement CoMP that is a communication mode in which communication is performed with the UE 100 through cooperation among a plurality of points, a plurality of points may be selected on the basis of the channel state measured by the MeNB 200-1, the MeNB 200-2, and each PeNB 300.

The selected points (the MeNB 200-1 and the MeNB 200-2, for example) cooperate to perform communication with the UE 100 on the basis of the measured channel state. For example, the MeNB 200-1 and the MeNB 200-2 may cooperate to perform communication with the UE 100 on the basis of the channel state measured by the MeNB 200-1 and the channel state measured by the MeNB 200-2.

Summary of Second Embodiment

In the present embodiment, each communication device (the UE 100-2, the HeNB 250, the PeNB 300, and the AP 400) notifies the MeNB 200 that selects the connection target of the UE 100-1 (and the UE 100-2) of the channel state information, and the MeNB 200 selects the connection target of the UE 100-1 on the basis of the notified channel state information and the channel state measured by the eNB 200. As a result, the connection target having a good communication state is selected on the basis of the channel state with each communication device, and thus, the UE 100-1 becomes capable of performing a good communication.

Further, in the present embodiment, each communication device (the UE 100-2, the HeNB 250, the PeNB 300, and the AP 400) transmits, together with the Channel report, the communication information on communication of each communication device, and the MeNB 200 selects the connection target of the UE 100-1 on the basis of the channel state information and the communication information. As a result, the connection target of the UE 100-1 reflects not only the channel state but also the communication information of each communication device, and thus, the MeNB 200 is capable of more appropriately selecting the connection target of the UE 100-1.

Further, in the modification of the present embodiment, the MeNB 200-1 and the MeNB 200-2 cooperate to perform communication with the UE 100 on the basis of the channel state measured by the MeNB 200-1 and the channel state measured by the MeNB 200-2. As a result, it is possible to effectively utilize the measured reference signal.

Further, in the modification of the present embodiment, the reference signal configuration information includes the transmission timing of the reference signal of the UE 100 for adjusting a timing at which the reference signal is received. As a result, the MeNB 200-2 and the PeNB 300-4 are capable of adjusting the timing at which the reference signal of the UE 100 is received, and thus, it is possible to prevent unsuccessful reception of the reference signal of the UE 100.

Other Embodiments

As described above, the present invention has been described with the embodiments. However, it should not be understood that those descriptions and drawings constituting apart of the present disclosure limit the present invention. From this disclosure, a variety of alternate embodiments, examples, and applicable techniques will become apparent to one skilled in the art.

For example, in the above-described first embodiment, the eNB 200 transmits the reference signal configuration information to each UE 100; however, this is not liming. The eNB 200 may notify the reference signal via another communication device (the UE 100, for example) rather than directly transmitting the reference signal configuration information to each UE 100. For example, in the first embodiment, the eNB 200 may notify the reference signal configuration information to the UE 100-2 by way of the UE 100-1.

Further, in the first embodiment, the eNB 200 receives the failure information to know that the UE 100-2 and the UE 100-3 fail to receive (intercept) the reference signal; however, this is not limiting. For example, the eNB 200 may know that each of the UE 100-2 and the UE 100-3 fails to receive the reference signal when it is not possible to receive at a timing at which the Channel report should be received in step 111.

Further, in the modification of the first embodiment, the UE 100-1 that receives the reference signal from the UE 100-2 performs the scheduling; however, this is not limiting. The UE 100-2 may receive the channel state information from the UE 100-1 to perform the scheduling.

Further, in the modification of the first embodiment, the UE 100-2 sets the reference signal, and transmits the reference signal configuration information indicating a content of the set reference signal to the eNB 200. The eNB 200 may transmit the reference signal configuration information from the UE 100-2, to the UE 100-1.

Further, in the second embodiment, the AP 400 receives by the cellular transceiver 410 the reference signal from the UE 100-1; however, this is not liming. Even when the AP 400 does not include the cellular transceiver 410, the AP 400 may receive by shifting a frequency of the reference signal from the UE 100-1.

It is noted that the reference signal from the UE 100-1 in step 301 may be a conventionally defined SRS, and may be a reference signal (Common SRS) that can be commonly received by the eNB 200 and the AP 400, for example.

Further, in the second embodiment, the MeNB 200 includes the determination device, however, this is not limiting. For example, the MME that is an upper device of the MeNB 200 may include the determination device, and the determination device may be provided in a server on a network. Further, the determination device (determination unit) may be configured by a controller of the MeNB 200.

Further, in the second embodiment, rather than the connection targets of the both of the uplink and the downlink are changed, only the connection target of the (up) link transmitted from the UE 100 may be changed.

In addition, the entire content of Japanese Patent Application No. 2013-135606 (filed on Jun. 27, 2013) is incorporated in the present specification by reference.

INDUSTRIAL APPLICABILITY

Based on the communication control method, base station, and user terminal according to the present invention, it is possible to measure a channel state from a user terminal while preventing a radio resource from being oppressed in view of a whole system without a need of defining a new reference signal.

The invention claimed is:

1. A communication control method for performing direct Device-to-Device (D2D) communications in a communication system including a first user terminal, a base station, and a second user terminal, comprising:
   receiving a reference signal transmitted from the second user terminal, at the first user terminal;
   measuring the reference signal received from the second user terminal, at the first user terminal;
   using a result of the measuring the reference signal to determine, by the first user terminal itself, a modulation and coding scheme (MCS) and frequency resources to be used for the direct D2D communications, at the first user terminal; and
   using the determined MCS and the determined frequency resources to perform the direct D2D communications, at the first user terminal.

2. The communication control method according to claim 1, further comprising:
   using the result of the measuring the reference signal to determine resource blocks to be used for the direct D2D communications, at the first user terminal; and
   using the determined resource blocks, the determined MCS, and the determined radio resources to perform the direct D2D communications, at the first user terminal.

3. A first user terminal for performing direct Device-to-Device (D2D) communications, comprising:
   a receiver configured to receive a reference signal transmitted from a second user terminal; and
   a controller configured to
      measure the reference signal received from the second user terminal,
      use a result of the measurement of the reference signal to determine, by the first user terminal itself, a modulation and coding scheme (MCS) and frequency resources to be used for the direct D2D communications, and
      use the determined MCS and the determined frequency resources to perform the direct D2D communications.

4. The first user terminal according to claim 3, wherein the controller is configured to
   use the result of the measuring the reference signal to determine resource blocks to be used for the direct D2D communications; and
   use the determined resource blocks, the determined MCS, and the determined radio resources to perform the direct D2D communications.

5. A device for performing direct Device-to-Device (D2D) communications, comprising:
   one or more processors configured to cause a first user terminal to
      receive a reference signal transmitted from a second user terminal;
      measure the reference signal received from the second user terminal;
      use a result of the measurement of the reference signal to determine, by the first user terminal itself, a modulation and coding scheme (MCS) and frequency resources to be used for the direct D2D communications; and
      use the determined MCS and the determined frequency resources to perform the direct D2D communications.

6. The device according to claim 5, wherein the one or more processors are configured to cause the first user terminal to
   use the result of the measuring the reference signal to determine resource blocks to be used for the direct D2D communications, and
   use the determined resource blocks, the determined MCS, and the determined radio resources to perform the direct D2D communications.

* * * * *